United States Patent
Funke et al.

(10) Patent No.: US 12,415,510 B1
(45) Date of Patent: Sep. 16, 2025

(54) SIMULATED VEHICLE POSITION ERRORS IN DRIVING SIMULATIONS

(71) Applicant: Zoox, Inc., Foster City, CA (US)

(72) Inventors: Joseph Funke, Redwood City, CA (US); Joshua Dean Egbert, Redwood City, CA (US); Rasoul Kabirzadeh, Redwood City, CA (US); Vincent Andreas Laurense, Foster City, CA (US); Amirhossein Tamjidi, Foster City, CA (US); Jacob Patrick Thalman, San Francisco, CA (US); David Evan Zlotnik, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 347 days.

(21) Appl. No.: 17/977,644

(22) Filed: Oct. 31, 2022

(51) Int. Cl.
  *B60W 30/095* (2012.01)
  *B60W 40/105* (2012.01)

(52) U.S. Cl.
  CPC ........ *B60W 30/095* (2013.01); *B60W 40/105* (2013.01); *B60W 2520/105* (2013.01); *B60W 2520/125* (2013.01); *B60W 2554/4041* (2020.02)

(58) Field of Classification Search
  None
  See application file for complete search history.

(56) References Cited

U.S. PATENT DOCUMENTS

| | | | | |
|---|---|---|---|---|
| 7,295,925 | B2* | 11/2007 | Breed | G08G 1/096783 340/436 |
| 9,229,453 | B1* | 1/2016 | Lee | B60W 30/12 |
| 9,280,899 | B2* | 3/2016 | Biess | G08G 1/166 |
| 9,650,051 | B2* | 5/2017 | Hoye | G07C 5/0841 |
| 12,049,236 | B2* | 7/2024 | Happold | B60W 50/023 |
| 2007/0042916 | A1* | 2/2007 | Iyer | C10M 167/00 508/110 |
| 2013/0081451 | A1* | 4/2013 | Kamada | G01M 1/122 177/136 |
| 2017/0329328 | A1* | 11/2017 | Horita | G08G 1/16 |
| 2017/0335560 | A1* | 11/2017 | Kensinger | E04B 1/34305 |
| 2018/0141515 | A1* | 5/2018 | Feeser | B60R 21/34 |
| 2019/0369626 | A1* | 12/2019 | Lui | G05D 1/0221 |
| 2021/0195822 | A1* | 7/2021 | Birk | A01B 69/008 |
| 2022/0080962 | A1* | 3/2022 | Bin-Nun | B60W 60/0015 |

* cited by examiner

*Primary Examiner* — Redhwan K Mawari
*Assistant Examiner* — Kai Wang
(74) *Attorney, Agent, or Firm* — Lee & Hayes, P.C.

(57) ABSTRACT

Techniques are described herein for determining simulated vehicle positional errors and correlating the positional errors with vehicle features. Such techniques may include receiving log data comprising trajectories and position data for a real vehicle, and executing a log-based simulated vehicle based on the log data. A simulated vehicle may be controlled to follow a simulation trajectory in a simulated environment based on the trajectory of the real vehicle. A simulation system may determine a difference between the positions of the simulated vehicle and corresponding positions of the real vehicle in the real environment. The techniques may further include determining a vehicle state features correlated to the lateral and/or longitudinal position errors of the simulated vehicle, and determining, based on the vehicle state features, position error distributions and/or models that can be used to control subsequent driving simulations.

20 Claims, 9 Drawing Sheets

SIMULATED VEHICLE POSITION ERRORS IN DRIVING SIMULATIONS

BACKGROUND

Simulated data and simulations can be used to test and validate the features and functionalities of systems, including features and functionalities that may be otherwise prohibitive to test in the real world (e.g., due to safety concerns, limitations on time, repeatability, etc.). For example, autonomous vehicles and other moving vehicles may use driving simulations to test and improve passenger safety, vehicle decision-making, sensor data analysis, and route optimization. However, creating simulations that both accurately reflect real-world scenarios and validate functionality of vehicle systems is technically challenging. For instance, when simulations are based on data that was previously captured by a vehicle operating in the real world, the simulated vehicle can have a velocity that deviates from the velocity associated with the real-world vehicle that captured the data, and/or may have an acceleration that deviates from the acceleration associated with the real-world vehicle. The velocity deviation and/or the acceleration deviation can produce position errors and can make it difficult to generate accurate simulations for the tested vehicle systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
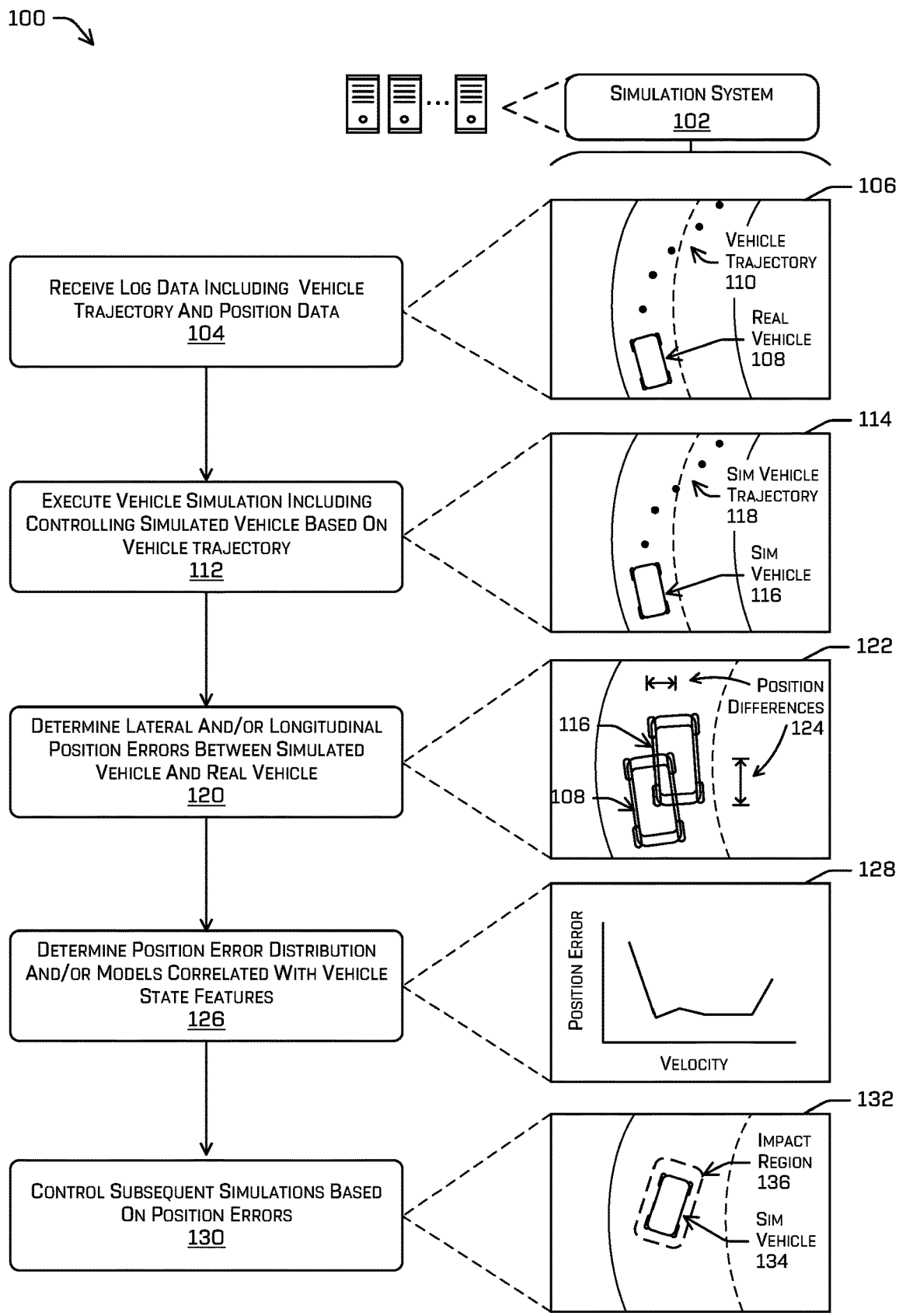
FIG. 1 is a pictorial flow diagram illustrating an example of determining position errors for a simulated vehicle in a driving simulation, in accordance with one or more examples of the disclosure.

This disclosure relates to techniques for determining simulation vehicle position errors within driving simulations, and correlating the various position errors with vehicle state features. As noted above, creating and executing driving simulations to accurately reflect real-world scenarios and validate the functionality of vehicle systems can be technically challenging. For instance, for driving simulations based on previous log data captured by a vehicle operating in the real world (e.g., log-based simulations), a simulation system may control a simulated vehicle to attempt to follow a similar or identical trajectory as the trajectory followed by a real vehicle, through a simulated driving scene similar or identical to that traversed by the real vehicle. However, due to the complexity and variability of vehicles operating in real-world driving environments, as well as the complexity and variability of the environments themselves, it can be difficult or impossible for the simulation system to precisely model the vehicle that captured the log data and the environment in which the vehicle was driving. For instance, the precise response of a vehicle to an acceleration command, braking command, or steering command, etc., may depend on several different complex and dynamic mechanical, electromechanical, hydraulic, and/or electronic systems within the vehicle drive system configured to control the movement and operation of the vehicle. Each of these systems may have additional components and subcomponents which may be subject to failures, wear and tear, and potential errors or malfunctions, etc. The subsequent position and/or state (e.g., velocity, acceleration, yaw, steering angle, etc.) at which the vehicle arrives following a sequence of commands also may be based on any number of dynamic environmental variables, such as road surface, temperature, wind speed and direction, etc.

As a result, during a log-based simulation when a simulation system attempts to control a simulated vehicle based on the corresponding real-world vehicle that captured the log data, positional differences between the simulated vehicle and the real-world vehicle may be likely or inevitable. For example, due to inaccuracies of the models used by the simulation system, the simulated vehicle may have different accelerations and velocities, both lateral and longitudinal, as compared to the real-world vehicle from which the log data was captured. Differences in velocities and/or accelerations may produce positional errors between the simulated vehicle and the corresponding real-world vehicle, which can cause difficulties in executing and evaluating simulations that are accurate and valuable for testing the vehicles controller of the simulated vehicles. For instance, when a simulated vehicle has a slightly faster velocity than an associated real vehicle from the log data, the simulated vehicle may follow a different driving path with a different sequence of positions as compared to the real vehicle. As a result, the simulated vehicle may have a different point of view from the real vehicle, but may have sensor data/perception data that is still based on the position of the logging vehicle. Such discrepancies in perception can decrease the accuracy of simulations and even invalidate results in high divergence cases.

During the execution of driving simulations in a simulated environment, the simulation system may rely on detected objects that are present in the real world and represented by the log data when controlling a simulated vehicle in the simulated environment. For instance, a planning component of the simulated vehicle may utilize indications of observed objects in the log data captured by the real-world vehicle when determining a trajectory for the simulated vehicle. However, when executing a simulation in such a manner, any divergences between the position of the simulated vehicle and the position of the real-world vehicle due can cause errors and/or inaccuracies in the driving simulation. For instance, a planning component running on the simulated vehicle may use simulated perception data of a first object that was entirely visible from the perspective of the real-world vehicle at a point in time, while during the same point in time in the simulation the first object may be occluded from the simulated vehicle due to a minor divergence in the velocity or acceleration of the simulated vehicle.

Accordingly, this disclosure describes techniques for improving driving simulations based on vehicle log data captured by vehicles traversing real-world physical environments. In various examples, a number of log-based driving simulations may be executed and analyzed to determine lateral and/or longitudinal positional errors between the simulated vehicle within the driving simulation and the corresponding vehicle from which the log data was captured. The aggregation of the positional differences may be used to model and/or determine probability distributions for positional error within log-based simulations. As described below in more detail, positional errors of simulated vehicles may be correlated with various vehicle feature states such as velocity, acceleration, steering angle, etc. For instance, ranges of low and high velocities may correlate with relatively large positional errors in log-based simulations, while middle-range velocity velocities may correlate with relatively small positional errors. Using the models and/or probability distributions for simulated vehicle positional errors, the simulation system may improve driving simulations using a number of techniques. For instance, the simulation system may adjust the impact regions (e.g., safety buffers) of the simulated vehicles based on predicted positional errors and/or position confidence levels of the simulated vehicle during the simulation. Additionally or alternatively, the simulation system may revise one or more criteria for evaluating the success or failure of the simulation, and/or may determine a confidence value for the simulation result, based on the predicted positional errors and/or position confidence levels of the simulated vehicle.

Various examples described herein may include receiving log data from real-world vehicles traversing physical driving environments, and the executing driving simulation in which simulated vehicles are controlled to attempt to follow the same or similar trajectories and/or driving paths that were followed by the real-world vehicles as reflected in the log data. As used herein, a trajectory of a vehicle may refer to a sequence of future vehicle states that the vehicle may attempt to follow. For example, the future vehicle states in a trajectory may correspond to future time intervals and/or longitudinal driving distances related to the current vehicle state. Each state in a trajectory may include, for example, position data (x-position and y-position), velocity data, acceleration data, yaw data, and/or steering angle data, etc. Because vehicle trajectories may represent the intended future driving positions and/or states of the vehicle, in some cases, trajectories may be referred to command trajectories and/or reference trajectories. Both real vehicles operating in physical environments and simulated vehicles in driving simulations may receive and/or generate reference trajectories for the vehicle to follow to traverse a driving environment. In some examples, a vehicle may be configured to determine an updated trajectory at each processing cycle (or tick) of the planner component (for a real vehicle) or of the simulation system (for a simulated vehicle), representing the trajectory that the vehicle will attempt to follow from its current state. When a trajectory is generated by and/or provided to a vehicle, the trajectory tracker (for a real vehicle) or vehicle controller (for a simulated vehicle) may use the future states in the trajectory to generate control commands (e.g., acceleration commands, braking commands, steering commands, etc.). The control commands for a vehicle (real or simulated) may be computed, based on the current vehicle state and the vehicle trajectory, as the set of commands to attempt to control the vehicle from its current states to the future intended vehicles states of the trajectory, at the times indicated by the trajectory.

In contrast, as used herein, the positional data for a vehicle may include the sequence of positions (and/or states) that the vehicle actually reached/achieved while traversing the environment. Both real vehicles and simulated vehicles may record their positional data at discrete points (e.g., discrete time intervals and/or longitudinal distance intervals) while traverse a driving environment. For a real or simulated vehicle, the distance between the positions in a reference trajectory (e.g., the positions that the vehicle was attempting to follow) and the positional data of the vehicle (e.g., the positions that the vehicle actually followed) represents the positional error for the vehicle.

Trajectories and positional data for real or simulated vehicles may represent sequences of discrete states along a driving route (or driving path) from a starting position (e.g., a start state) to an end position (e.g., an end state). For a particular driving route, there are any number of possible trajectories and driving paths that the vehicle may take to traverse from the start state to the end state, including different positions, steering angles, velocities, and/or accelerations at the different intermediate points along the route. In some examples, a driving route may pass through a portion of a single lane and/or roadway, which can be straight or can include any number of curves or obstacles around which the vehicle may navigate from the start state to the end state. In other examples, driving routes may pass through more complex environments and/or include more complex driving maneuvers, such as lane changes, merging lanes, junctions, intersections, and the like, through which the vehicle may navigate between the start state and the end state.

As used in these examples, a "path" may refer to a sequence of spatial (e.g., geometric) states, in which each spatial state corresponds to a point or position in the path, and each spatial state includes a combination of geometric data such as an x-position, y-position, yaw, and/or steering angle, etc. In contrast, in such examples, a "trajectory" may refer to a sequence of spatiotemporal states rather than geometric states. For example, a trajectory may be defined as a sequence of spatiotemporal states, in which each state is specified by any combination of an x-position, a y-position, a yaw, a yaw rate, a steering angle, a steering angle rate, a velocity, and/or an acceleration, etc.

Similarly, in various examples described herein, vehicle trajectories and/or vehicle positional data may be represented as sequences of positions (or points), or as sequences of states. As used in such examples, a "position" (or "point") may refer to a geometric (or spatial) state including position data (e.g., x-position, y-position, yaw, steering angle, etc.).

In contrast, in such examples, a "state" may refer to a combination of a geometric state and/or a temporal state, which may include x-position, y-position, yaw, yaw rate, steering angle, steering angle rate, velocity, and/or acceleration, etc. In practice, a vehicle may be controlled to implement numerous trajectories and/or driving paths, and to pass through numerous individual points, positions, and/or states while navigating along the route from the starting position (e.g., start state) to the end position (e.g., end state).

In various examples, a simulation system can receive log data captured by any number of vehicles associated with various driving trips and/or driving maneuvers performed by the vehicles. Each log data may be associated with (e.g., captured by) a real vehicle operating in physical driving environment. The log data for a real vehicle may include, among other data, the trajectories generated by the vehicle (e.g., the reference trajectories that the vehicle was attempting to follow) at various points in time in the log data, as well as the positional data stored for the vehicle (e.g., the positions that the vehicle actually reached) at the various points in time during a driving trip in a real-world environment. The simulation system can receive log data captured during previous operations of any number of vehicles operating in any number of different environments. Additionally or alternatively, the log data may include map data, vehicle type/specifications, vehicle software versions, vehicle lights/emitter controls, etc.) during the course of the driving trips.

In some examples, the real-world vehicles from which the log data was captured can be implemented with vehicle software having various software versions, and can have various vehicle types. To execute a log-based driving simulation, including a simulated vehicle controlled based on log data from a real vehicle, the simulation system can determine the trajectories followed by the real vehicle from the log data, and may control the simulated vehicle using the same trajectories at corresponding points in the time (and/or corresponding locations) during the simulation. For instance, for a reference trajectory followed by a real vehicle during a period of time during the log data, the simulation system may use the same reference trajectory to control the simulated vehicle for a similar or identical period of time during the simulation. The simulated vehicle also may be controlled based on vehicle data and/or specifications associated with the real-world vehicle, including but not limited to, data indicating software versions associated with the vehicle, data indicating a vehicle type associated with the vehicle, etc. As described below, when correlating positional error with vehicle states/features, the simulation system also may filter the log data to aggregate subsets of vehicle logs based on the software version(s) and/or vehicle types.

A planner component of the simulation system can control a simulated vehicle during a log-based driving simulation, based at least in part on the log data captured by a real vehicle, where the simulated vehicle may be controlled to follow a similar (or identical) trajectory in a similar (or identical) simulated environment. In some cases, both real and/or simulated vehicles may be controlled to determine and follow different trajectories at each different processing cycle (or tick) of the planner component. Alternatively or additionally, a real or simulated vehicle may follow a single consistent trajectory for multiple processing cycles, representing a time period ranging from a fraction of a second to any number of seconds or minutes during a driving trip. In some examples, at each processing cycle of the planner, the data recorded for a real vehicle or a simulated vehicle may include a timestamp indicating a current time, the commanded trajectory that the vehicle is to follow at that time, and the positional data (and/or other state data) of the vehicle at that time. During a driving simulation based on log data, the simulated vehicle may be controlled to follow the same trajectories followed by the real vehicle at the same relative times. The trajectories followed by the simulated vehicle may remain consistent or may change at various times during the simulation based on the changing trajectory of the real vehicle. As an example, the log data received by a simulation system can include a first trajectory followed by a real vehicle from a first location to a second location during a first time period, and a different trajectory followed by the real vehicle from the second location to a third location during a second time period.

During and/or after the execution of the driving simulation, the simulation system can determine the positional differences between the positional data of the simulated vehicle in the simulated environment (e.g., based on data recorded by the simulation system), and the corresponding positional data of the real vehicle in the real environment (e.g., based on the log data). The differences between the positions of the simulated vehicle and the positions of the real vehicle can include longitudinal position differences (or errors) and/or lateral position differences (or errors). In some examples, the positional errors for various driving simulations may be analyzed with respect to one or more vehicle features (e.g., vehicle states, attributes, etc.) of the real vehicle, to correlate the positional errors of the simulated vehicle. For example, vehicle features may include velocity, acceleration, steering angle of the real vehicle, etc.

In some examples, the simulation system may determine position error distributions, models, and/or functions correlating the simulated vehicle positional errors and/or simulated vehicle position confidence values with one or more vehicle features. For instance, a longitudinal position error distribution and/or a lateral position error distribution for simulated vehicles may be determined relative to the vehicle velocity and/or acceleration. For example, the simulation system can determine, based on the vehicle velocity associated with the real vehicle and the difference in the positions of the simulated vehicle and the real vehicle, a velocity-based position error distribution. As another example, the system can determine, based on the vehicle acceleration associated with the real vehicle and the difference in the positions of the simulated vehicle and the real vehicle, an acceleration-based position error distribution, etc.

Using the positional error distributions, models, and/or functions, the simulation system may determine, during the execution of a driving simulation, the predicted positional errors and/or confidence value(s) associated with the positions (e.g., lateral and longitudinal) of the simulated vehicle during the time period of the simulation. As described in more detail below, the predicted positional errors and/or position confidence values for a simulated vehicle may be different for the lateral and the longitudinal positional errors/confidences at the same time during a simulation. Additionally, the predicted positional errors and/or position confidence values for the simulated vehicle may change throughout a single driving simulation, based on changes to the vehicle features/attributes (e.g., speed, acceleration, steering angle, etc.) that may be correlated with the positional errors.

In some examples, during the execution of a driving simulation, the simulation system may determine one or more relevant features of the current vehicle state (e.g., velocity, acceleration, steering angle, etc.), and use the current features to determine the predicted positional errors and/or position confidence values for the simulated vehicle.

The simulation system then may use the predicted positional errors and/or position confidence values to determine an impact region for the simulated vehicle during the simulation. In some cases, the impact region may be represented as a bounding box around the simulated vehicle. The bounding box may be based on the dimensions (e.g., length and width), shape, and yaw of the simulated vehicles, and may include a safety buffer representative of a safe distance around the simulated vehicles to avoid collisions and/or near-miss collisions during the simulation. In various examples, the lateral size and longitudinal size of the safety buffer may be determined respectively based on the lateral and longitudinal predicted positional errors and/or position confidence values for the simulated vehicle. Additionally or alternatively, the size and shape of the impact region associated with a simulated vehicle also may depend on the size, speed, type, or other characteristics of the simulated vehicle. For instance, a larger impact region may be used for higher-speed vehicles, when driving near vulnerable objects (e.g., bicycles or pedestrians), or for scenarios in which the simulation system has less confidence in the perception data for the size, shape, trajectory or other state parameters of the log data. During the simulation, when the impact region around the simulated vehicle is breached by (e.g., overlaps with) another object in the simulation, the simulation system may determine that the simulation results in a potential collision and/or near-miss collision.

The techniques and systems described herein may improve the operation of simulation systems and/or may improve the quality and efficacy of driving simulations. For example, by correlating vehicle state features (e.g., velocity, acceleration, steering angle, etc.) with positional errors in the positions of simulated vehicles during driving simulations, the simulation system can more accurately predict estimated positional errors (both lateral and longitudinal) during driving simulations. The improved prediction of the positional errors and/or positional confidences for simulated vehicles during driving simulations may allow the simulation system to execute the simulations more effectively (e.g., by adjusting impact region sizes based on vehicle feature states), as well as evaluating the simulations more accurately (e.g., by adjusting simulation results, confidences, etc.). Correlating position errors/confidences with vehicle features also may provide advantages for targeted simulation testing, further increasing simulation accuracy, and may reduce the memory and compute resources consumed during simulation test runs.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in semi-autonomous or non-autonomous vehicles, and/or in an aviation or nautical context.

FIG. 1 illustrates an example process 100 for determining position errors/confidences associated with simulated vehicles in driving simulations, and executing driving simulations based on the position errors/confidences. In various examples, some or all operations of the example process 100 may be performed by computing devices configured as a simulation system 102. The simulation system 102 may include, for instance, a driving simulation system, virtual driving simulator or other type of simulation system, and/or sensor engines configured to generate and provide sensor input data to simulation systems. Process 100, and various other examples herein, are described in reference to driving simulations during which a simulated vehicle including one or more simulated sensors operates within a simulated environment. During a simulation, the simulation system 102 provides the simulated vehicle sensors with sensor input data representing the simulated environment and the simulated objects therein, and the simulated vehicle responds to the sensor input data by controlling the vehicle. However, it can be understood from the context of this disclosure that techniques described herein are not limited to driving simulation systems, and may be implemented in a similar or identical manner within other systems, including but not limited to video gaming systems, virtual reality systems, non-driving simulation systems (e.g., flight simulators, nautical navigation simulators, space navigation simulators, etc.), and/or image/sensor data processing systems operating in physical (e.g., non-simulated) environments.

At operation 104, the simulation system 102 can receive log data associated with any number of driving routes, trips, maneuvers, etc., for vehicles operating in real-world driving environments. Each log data received in operation 104 may be associated with a particular vehicle traversing a driving environment for a particular period of time. The log data may include, for any number of time points in the log data spanning the period of time, various vehicle state data and/or data describing the environment at the particular time point. The vehicle state data stored in the log data at each time point may include the current position of the vehicle (e.g., x-position and y-position), the current vehicle velocity, yaw, steering angle, etc. The vehicle state data stored in the log data also may include the trajectory being followed by the vehicle at the particular time point (e.g., a trajectory generated by a planner component of the vehicle at each tick). As shown in box 106, the log data in this example may include data representing the states of a real vehicle 108 at a sequence of time points captured within the log, including the positional data for the real vehicle 108 and reference trajectory 110 followed by the real vehicle at each of the time points. In some examples, the log data also may include sensor data and/or data based on sensor data detected by the vehicle that captured the log data, such as data identifying characteristics of the environment in which a vehicle was operated, objects within the proximity of the vehicle, attributes or characteristics of the environment and objects (e.g., classifications, sizes, shapes, positions, trajectories, etc.).

At operation 112, the simulation system may execute a driving simulation, including controlling a simulated vehicle based at least in part on the log data received in operation 104. As shown in box 114, during the driving simulation, a simulated vehicle 116 representing the real vehicle 108 may be instantiated within a simulated environment based at least in part on the environment in which the real vehicle 108 captured the log data. During the simulation, the simulated vehicle 116 may be controlled to perform a trajectory 118 similar or identical to the trajectory 110 followed by the real vehicle 108 at the same corresponding time point. Additionally, during the driving simulation, the simulation system may determine the position and/or other vehicle states for the simulated vehicle 116 at a number of different time points during the simulation. In some examples, each time step in the driving simulation may represent a point in the simulation at which the simulation system determines and records the current vehicle state (including position) of the simulated vehicle 116, determines the trajectory 118 for the simulated vehicle to follow from the current state, and initiates control commands for the simulated vehicle to follow (e.g., execute or track) the determined trajectory. As discussed above, in some instances, the real vehicle 108 and the simulated vehicle 116 may execute identical trajectories at corresponding time steps during their respective driving trips. However, in some cases, time and/or spatial differences between the real vehicle 108 and simulated vehicle 116 may cause the simulated vehicle to determine a different trajectory from the one followed by the real vehicle at the corresponding time step.

At operation 120, the simulation system 102 may determine positional error(s) between the simulation vehicle 116 and the real vehicle 108 at one or more corresponding points in time during the simulation. As described above, during the simulation the simulated vehicle 116 may be controlled by a planner component executed on the simulation system 102. The planner component for the simulated vehicle 116 may execute any number of times during the simulation, for example, periodically at time intervals (e.g., 0.1 secs, 0.5 secs, etc.) or based on longitudinal distance intervals traveled by the simulated vehicle 116 (e.g., 1 meter, 5 meters, 10 meters, etc.). In some examples, the planner component for the simulated vehicle 116 may be synchronized to execute at the same time intervals and/or distance intervals as the planner component of the real vehicle 108 when the log data was captured.

During a driving trip performed by a real vehicle 108 or a simulated vehicle 116, components of the vehicle (for the real vehicle) or the simulation system (for the simulated vehicle) may determine the current position of the vehicle, as well as additional state data for the vehicle, other objects in the environment, and the driving scene itself. The components may then determine a trajectory for the vehicle to follow until at least the next time point, when another execution of the components may be performed. The determination of the trajectory may include selecting the same trajectory that the vehicle has been following, or determining a new/modified trajectory for the vehicle to follow from that point forward. For instance, a planner component within the real vehicle 108 may determine a new trajectory for the vehicle to follow based on a perceived change in the driving environment (e.g., an unanticipated movement of an agent/object). Additionally, a planner component may determine new trajectory for a vehicle based on determining that the current state and/or position of the vehicle has diverged from the predicted state/position for the current time point, and a modified trajectory may be required to correct the course of the vehicle to reach its intended end state within the current driving route.

To determine the lateral and longitudinal position errors for the simulated vehicle 116 during the simulation, the simulation system 102 may compare the positional data recorded by the simulation system 102 for the simulated vehicle 116 with the corresponding positional data in the log data for the real vehicle 108, at one or more points during the simulation. As shown in box 122, the positional differences 124 between the real vehicle 108 and simulated vehicle 116 may have a lateral component and/or a longitudinal component at each time point when the differences are determined. Additional techniques and details for determining the lateral position differences (or errors) and longitudinal position differences (or errors) are described in more detail below in reference to FIGS. 2A-2D.

At operation 126, the simulation system 102 may analyze the position error data determined in operation 120 for multiple driving simulations, and may determine one or more position error distributions, functions, and/or models based on the positional errors of the simulated vehicles. In various examples, the simulation system 102 may aggregate position error data from any number of simulations, filter the data based on one or more relevant factors (e.g., vehicle type, driving conditions, etc.), and then correlate the simulated vehicle position errors to one or a combination of vehicle state features. The various position error distributions, functions, and/or models determined in operation 126 may include different distributions/functions/models for lateral error and longitudinal error. Each of the simulated vehicle position lateral error and/or longitudinal error may correlate to one or more vehicle state features, such as velocity, acceleration, and/or steering angle. Box 128 depicts an example distribution of position error (which may be lateral position error, longitudinal position error, or combined position error) based on vehicle velocity. As shown in this example, lower and higher velocity ranges may correlate to relatively larger positional errors for simulated vehicles, while middle-range velocities may correlate to relatively smaller positional errors. As another example, lower acceleration/deceleration ranges for vehicles may result in relatively smaller positional errors for simulated vehicles, while greater vehicle accelerations/decelerations may result in relatively larger positional errors, etc.

At operation 130, the simulation system 102 may execute one or more subsequent driving simulations based at least in part on the position error distributions, functions, and/or models determined in operation 126. As noted above, the data analysis performed in operation 126 may correlate the simulated vehicle position errors with one or more vehicle state features, including but not limited to velocity, acceleration, and/or steering angle. After determining the correlations between vehicle state features and the positional error in the driving simulations, the simulation system 102 may use the resulting distributions, functions, and/or models representing the correlations to generate, execute, and/or evaluate subsequent simulations. In this example, the subsequent driving simulations executed in operation 130 may include log-based simulations based on log data captured by real vehicles, or may include additional simulation types (e.g., non-log based), such as modified log-based simulations, synthetic simulations, log-based simulations using log data captured during simulations, etc.

For example, as shown in box 132, the simulation system 102 may determine and/or modify an impact region 136 associated with a simulated vehicle 134, based on the current state feature (e.g., velocity, acceleration, steering angle, etc.) of the simulated vehicle 134 during the simulation. The impact region 136 may be represented as a bounding box around the simulated vehicle 134, corresponding to a safety buffer to avoid collisions or near-miss collisions during the simulation. For example, when the boundary of the impact region 136 overlaps with the boundary of another object in the simulation, the simulation system 102 may evaluate the simulation as a failure. In other examples, the impact region 136 and/or multiple other impact regions may be used to determine the confidence level associated with the simulated vehicle 134 safely traversing the simulated environment. When the driving simulation fails, and/or when simulation system 102 determines that a potential collision or near-miss collision has occurred during the simulation, the system may determine that a real vehicle also may have a potential collision or near-miss collision when encountering a similar driving scene to that in the simulation shown in box 132.

As noted above, the simulation system 102 in operation 130 may control the generation, execution, and/or evaluation of subsequent simulations in a number of ways based on the position error distributions, functions, and/or models determined in operation 126. Additionally or alternatively to generating or modifying impact regions 136 of simulated vehicles 134 based on the position error distributions/functions/models, various additional techniques may include generating and/or modifying driving simulations so that the vehicle state features predominately (or only) correlate to smaller simulated vehicle position errors. Driving simulations generated using such techniques may provide more realistic driving simulations and may be executed with more consistency and accuracy, smaller impact regions, etc. Additional techniques that may be performed by the simulation system 102 may include selecting particular subsets of simulation tests from a larger battery of simulation tests to execute during a test run, based on which simulation tests have vehicle feature states correlated with smaller simulated vehicle position errors. Additionally or alternatively, the simulation system 102 also may determine confidence values associated with the results of driving simulations, by determining the predicted position errors and/or position confidences of the simulated vehicle, based on the state features of the simulated vehicle.

FIGS. 2A-2D depict examples of various techniques for determining position errors between a real vehicle operating in an environment (e.g., as recorded in log data) and a simulated vehicle in a log-based simulation based on the real vehicle. As described below in more detail, position errors may be determined in distances, including lateral and/or longitudinal distance components. In order to determine the position errors, the simulation system 102 also may align and/or synchronize the trajectories (and/or driving paths) of the simulated vehicle with the corresponding real vehicle, using various synchronization techniques to more accurately determine the individual lateral and longitudinal error components.

Figure 2A:
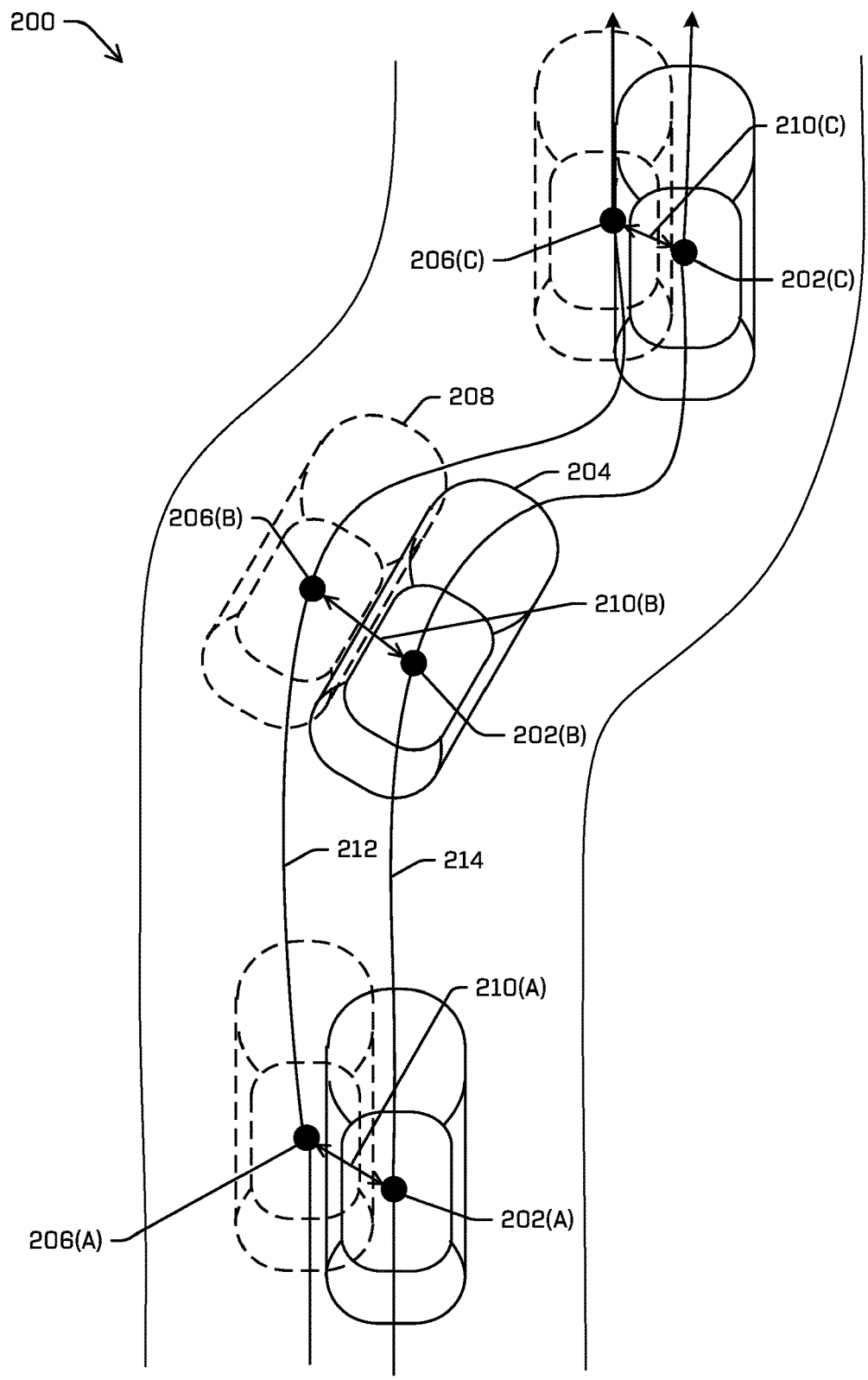
FIG. 2A depicts an example of the differences between a set of vehicle positions of a first vehicle operating a physical environment and a simulated vehicle within a log-based driving simulation based on the first vehicle, in accordance with one or more examples of the disclosure.

FIG. 2A depicts an example diagram 200 showing a set of positional differences between the vehicle positions of a real vehicle operating in a real-world physical environment, and a simulated vehicle in a log-based driving simulation based on the real vehicle. In this example, a number of vehicle positions 202 are shown for a simulated vehicle 204 within a log-based driving simulation. Additionally, a corresponding number of vehicle positions 206 are shown for the real vehicle 208 from which the log data was captured for the log-based simulation. As described above, even when starting states, driving environments, and the trajectories followed, and are the same between the simulated vehicle 204 and the real vehicle 208, positional differences may occur between the positions/states reached by simulated vehicle 204 and the real vehicle 208.

In this example, the real vehicle 208 is depicted following a driving path 212 that is going straight within a driving lane, performing a slight turn (e.g., navigating a road curve or performing a lane change), and then continuing straight. While traveling along the path 212, a vehicle system associated with the real vehicle 208 may periodically record log data indicating discrete vehicle positions 206 (e.g., longitudinal positions, lateral positions) of the real vehicle 208, operation data (e.g., velocity, acceleration, yaw, steering angle, etc.), and the trajectory being followed by the real vehicle 208 at each discrete point. As shown in this example, the real vehicle 208 may record log data indicating a first vehicle position 206(A) for the real vehicle 208 at a first point in time (t=1) after a starting point in the log data. The log data can further indicate a second vehicle position 206(B) associated with the real vehicle 208 at a second point in time (t=2) after the first point in time, and a third vehicle position 206(C) associated with the real vehicle 208 at a third point in time (t=3) after the second point in time. For each of the vehicle positions 206, the log data may indicate latitude positions and longitude positions for the real vehicle 208.

As discussed above, the simulation system 102 may receive the log data captured by the vehicle systems of the real vehicle 208, and may use the log data to generate a log-based simulation including a simulated vehicle 204 traversing a simulated driving environment. In this example, the simulated vehicle 204 may be controlled to follow similar or identical trajectories as the real vehicle, which may result in the simulated vehicle 204 following a driving path 214 that is similar or identical to the path 212 followed by the real vehicle 208. For instance, the path 214 may include a sequence of vehicle positions determined by the simulation system 102 during the execution of the simulation. In some examples, at each point in the simulation, the simulated vehicle 204 may follow the same (or a similar) trajectory as the trajectory followed by the real vehicle 208. As noted above, each trajectory may include a sequence of vehicle states and/or commands representing vehicle positions, velocities, accelerations, steering angles, etc. Examples of generating a simulation trajectory based at least in part on log data containing a trajectory for a real vehicle are discussed above in connection with FIG. 1. In this example, the simulated driving path 214 includes a first simulation position 202(A) associated with the simulated vehicle 204 at a first point in time (t=1), the first point in time can be the same relative period of time after initiation of the simulation (t=0). The trajectory of the simulated vehicle can further include a second simulation position 202(B) associated with the simulated vehicle 204 at a second point in time (t=2) after the first point in time, and a third simulation position 202(C) associated with the simulated vehicle 204 at a third point in time (t=3) after the second point in time, etc. The simulation system 102 may record the positional data for the simulated vehicle 204, including any number of simulation positions 202 of the simulated vehicle 204, at various points in time during the simulation, including the latitude positions and longitude positions for the simulated vehicle 204 at each position 202.

As shown in this example, the simulation system 102 may determine differences between each of the simulation positions 202 of the simulated vehicle 204 in the simulated environment, and the corresponding positions 206 of the real vehicle 208 in the real-world driving environment. In this example, the comparisons may be performed at corresponding time points. For instance, the respective positions of the real and simulated vehicles may be considered to be aligned at the starting time of the driving simulation (t=0), and the relative vehicle positions may be compared at a sequence of subsequent times during the simulation (e.g., t=0.5 secs, t=1 sec, t=1.5 secs, etc.). In this example, the simulation system 102 may determine the absolute distances 210 between the vehicle positions 202 and 206 at each corresponding time point. In other examples, described below in more detail, the simulation system 102 may align or synchronize the vehicle trajectories and/or may determine separate lateral and longitudinal positional differences.

The simulation system 102 also may determine vehicle state features, such as velocity, acceleration, steering angle, and/or any other vehicle state data, associated with each time point during the simulation (and/or corresponding time points during the log data). As noted above, after determining the determining positional error for a number of different driving simulations, the simulation system 102 may aggregate and analyze the simulated vehicle positional error data, to determine correlations between one or more vehicle state features and data and the magnitude of the lateral and/or longitudinal positional errors. Once the correlations have been determined (e.g., using regression analysis), the correlations may be expressed as position error distributions, models, and/or functions determined by the simulation system 102, and may be used when performing subsequent driving simulations as discussed above. For example, the simulation system 102 may generate position error distribution plots based at least in part on the vehicle state features and the corresponding position differences. As described below in reference to FIGS. 5A-5B, position error distribution plots can include, for example, velocity-based lateral position divergence plots and/or longitudinal position divergence plots, based on the aggregated position error data from a number of driving simulations.

Figure 2B:
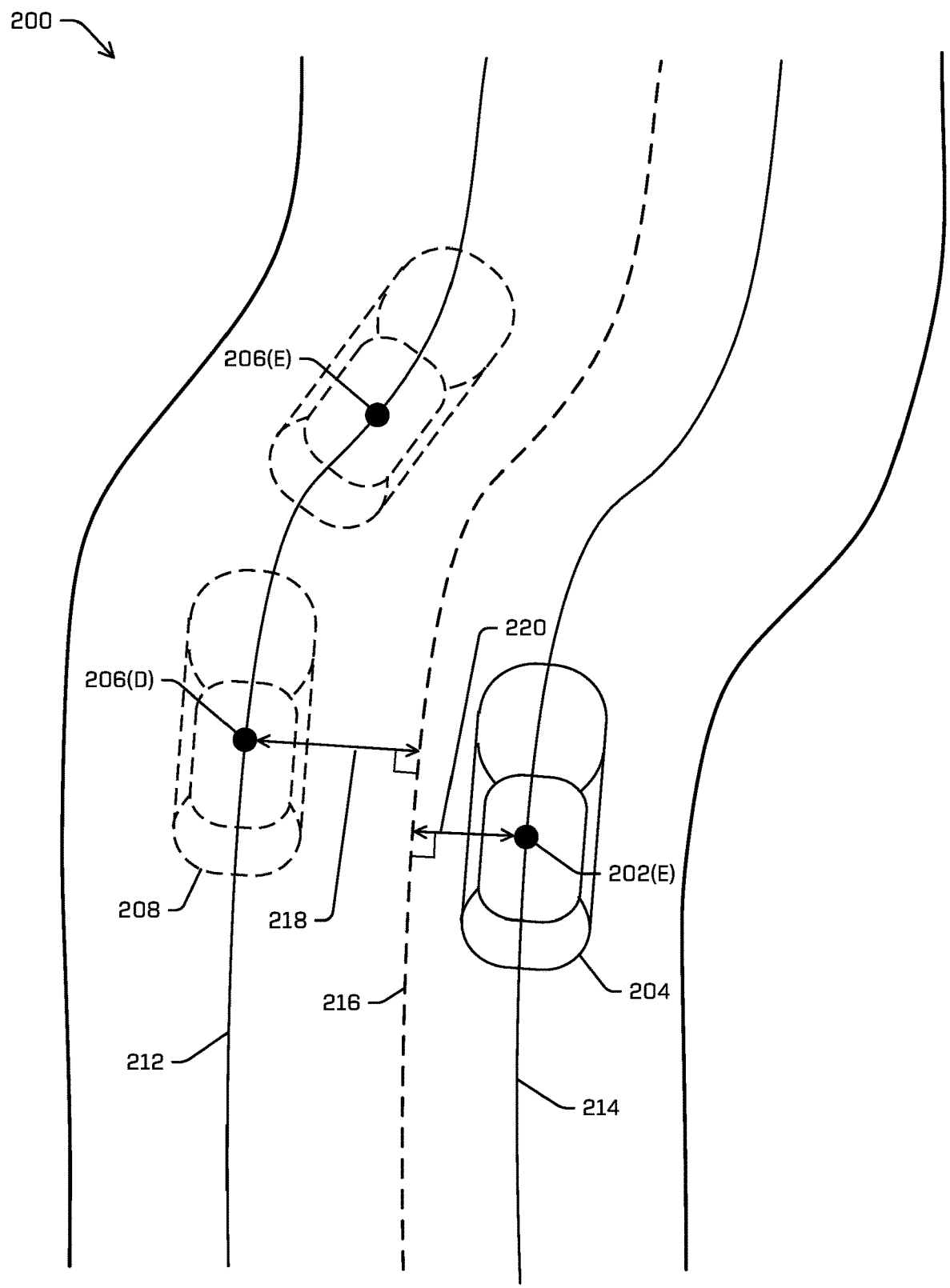
FIG. 2B depicts an example technique for determining lateral position errors between the first vehicle and the corresponding simulated vehicle, in accordance with one or more examples of the disclosure.

FIG. 2B depicts a technique for determining lateral position errors between the simulated vehicle 204 and the corresponding real vehicle 208. In this example, the vehicles, driving paths and/or trajectories shown in FIG. 2B may be similar or identical to those shown in FIG. 2A, or may correspond to different vehicles and/or different trajectories. In some examples, to determine a lateral position error of the simulated vehicle 204, the simulation system 102 initially may spatially align the positions (or states) followed by the simulated vehicle 204 during the simulation, with the positions (or states) of the real vehicle 208 as stored in the log data. As noted above, a trajectory of a vehicle (e.g., a simulated vehicle 204 or a real vehicle 208) may include a sequence of future vehicle positions (and/or states) provided for the vehicle to attempt to follow. When a trajectory is generated by and/or provided to a vehicle, a vehicle controller or a trajectory tracker component on the vehicle may use the sequences of position/state data in the trajectory to generate control commands (e.g., using acceleration commands, braking commands, steering commands, etc.) for the vehicle to execute to attempt to reach the future positions/states of the trajectory, at the times indicated by the trajectory. In contrast, positional data for a vehicle (e.g., a simulated vehicle 204 or a real vehicle 208) may represent the sequence of positions (and/or states) that the vehicle actually reached while navigating the environment. The difference between the positions in the commanded trajectory that was generated and/or provided to a vehicle, and the vehicle positions in the positional data that the vehicle actually achieved, represents the positional error for the vehicle. In the log data for a real vehicle 208, and in the simulation data recorded during the simulation for the simulated vehicle 204, both the trajectories provided for the vehicles to follow and the positional data representing the driving paths actually followed by the vehicles may be stored as sets of discretized values (e.g., every tick, every 0.1 secs, . . . , every 0.5 secs, etc.).

In these examples, the driving paths 212 and 214 include points representing the discrete positional data for the real vehicle 208 and simulated vehicle 204, respectively. followed. Each point in the driving paths 212 and 214 for the simulated vehicles 204 and the real vehicle 208 may include various vehicle state data, such as the x-position, y-position, velocity, yaw, and steering angle of the vehicle at the particular point. Therefore, in this example, position 202(E) may represent a point on the driving path 214 of the simulated vehicle 204, and positions 206(D) and 206(E) may represent points on the driving path 212 of the real vehicle 208.

To spatially synchronize the positional data on the driving paths of the simulated vehicle 204 and the real vehicle 208, the simulation system 102 may longitudinally align the two driving paths, rather than temporally aligning the driving paths. For instance, the position 202(E) of the simulated vehicle 204 and position 206(E) of the real vehicle may represent corresponding time points. However, due to velocity differences causing longitudinal position error between the trajectories, measuring the lateral position error of the simulated vehicle 204 based on the lateral difference between position 202(E) and position 206(E) may result in an inaccurate lateral position error measurement. To measure the lateral position error more accurately, the simulation system 102 in this example first may longitudinally align the driving paths, and then measure the lateral position difference of the aligned driving paths. In this case, at the longitudinally equivalent positions 202(D) and 206(E), the simulation system 102 may determine the difference between each of the driving paths 212 and 214 and the reference trajectory 216. In this example, the reference trajectory 216 (or commanded trajectory) may be the trajectory provided to and followed by both the vehicle 208 and the simulated vehicle 204 during the portion of the simulation depicted in this example.

As shown in this example, both the real vehicle 208 and the simulated vehicle 204 may have a lateral positional error with respect to the reference trajectory 216. As noted above, the reference trajectory 216 may represent the trajectory that both the real vehicle 208 and the simulated vehicle 204 were attempting to follow while traversing their respective environments. The lateral position error for the real vehicle 208 can be determined at any point in the positional data (e.g., the log data) for the real vehicle 208, by determining the distance between a position 206 on the driving path 212 and the reference trajectory 216. For example, line 218 illustrates the lateral position error of the real vehicle 208 at point 206(D), and may be computed by determining the distance between point 206(D) and the closest point of the reference trajectory 216.

As noted above, a reference trajectory followed by a real or simulated vehicle may include a number of discrete future vehicle positions and/or states that the vehicle may attempt to follow. Therefore, in some examples, to determine the later positional error of a vehicle, the simulation system may determine the lateral distance between an actual position reached by the vehicle and the nearest discrete position in the reference trajectory. In other examples, the simulation system may use projection and/or interpolation to fit the discrete points of the reference trajectory into a continuous line. For instance, in the example depicted in FIG. 2B, reference trajectory 216 may be a continuous line determined by interpolating and/or projecting the discrete vehicle states of the reference trajectory followed by the real vehicle 208 and the simulated vehicle 204. In these examples, the simulation system may determine the lateral positional error of a vehicle (real or simulated) by determining the distance between a position of the vehicle and the closest point on the continuous reference trajectory 216. To determine the distance, the system simulation may generate a normal line from the vehicle position that intersects the reference trajectory 216 at a 90-degree angle. As shown in this example, line 218 represents the lateral position error of the real vehicle 208 at point 206(D), and line 220 represents the lateral position error of the simulated vehicle 204 at the point 202(E).

Using these techniques, the simulation system 102 may determine the lateral position error of the real vehicle 208 relative to the reference trajectory 216, the lateral position error of the simulated vehicle 204 relative to the reference trajectory 216, and/or the lateral position error of the simulated vehicle 204 relative to the real vehicle 208. For instance, the simulation system 102 may determine the lateral position error of the real vehicle 208 relative to the reference trajectory 216 at any number of points within the positional data of the real vehicle 218. Separately, the simulation system 102 may determine the lateral position error of the simulated vehicle 204, relative to the reference trajectory, at any number of points within the positional data of the simulated vehicle 204. To determine the overall lateral position error of the simulated vehicle 204, relative to the real vehicle 208, the simulation system 102 then may compare and then add (when the position errors are on the opposite side of the reference trajectory 216) or subtract (which the position errors are on the same side of the reference trajectory 216) the lateral position errors of the real vehicle (e.g., line 218) and the simulated vehicle (e.g., 220).

When determining the lateral position error of the simulated vehicle 204 relative to the real vehicle 208, in some cases, the simulation system 102 may determine and compare the lateral position errors at the points that are closest spatially (e.g., closest longitudinally) within the positional data of the simulated vehicle 204 and the real vehicle 208, rather than comparing the lateral position errors at corresponding times. For instance, the simulation system may determine that point 202(E) in the positional data of the simulated vehicle 204 is spatially closest to point 206(D) in the log data of the real vehicle 208, even though point 202(E) corresponds temporally to point 206(E). Based on this determination, the simulation system 102 may sum the lateral position error for the vehicle position point 206(D) (e.g., line 218) and the lateral position error for the simulation position point 206(E), to determine an overall lateral position error for the simulated vehicle 204 at the position point 206(E). In this example, the line 218 and line 220 may be summed because the driving paths 212 and 214 are on opposite sides of the reference trajectory 216. When the driving paths 212 and 214 are on the same side of the reference trajectory 216, this may indicate that the lateral position errors for the simulated vehicle 204 and the real vehicle are errors in the same direction. In such cases, to determine the overall lateral position error for the simulated vehicle 204 at a position point, the simulation system 102 may subtract, rather than sum, the distance values. Additionally, although this example shows a determination for a single lateral position difference, the simulation system 102 may use similar or identical techniques to determine the lateral position differences at each point in the trajectory followed by the simulated vehicle 204 during the simulation.

Figure 2C:
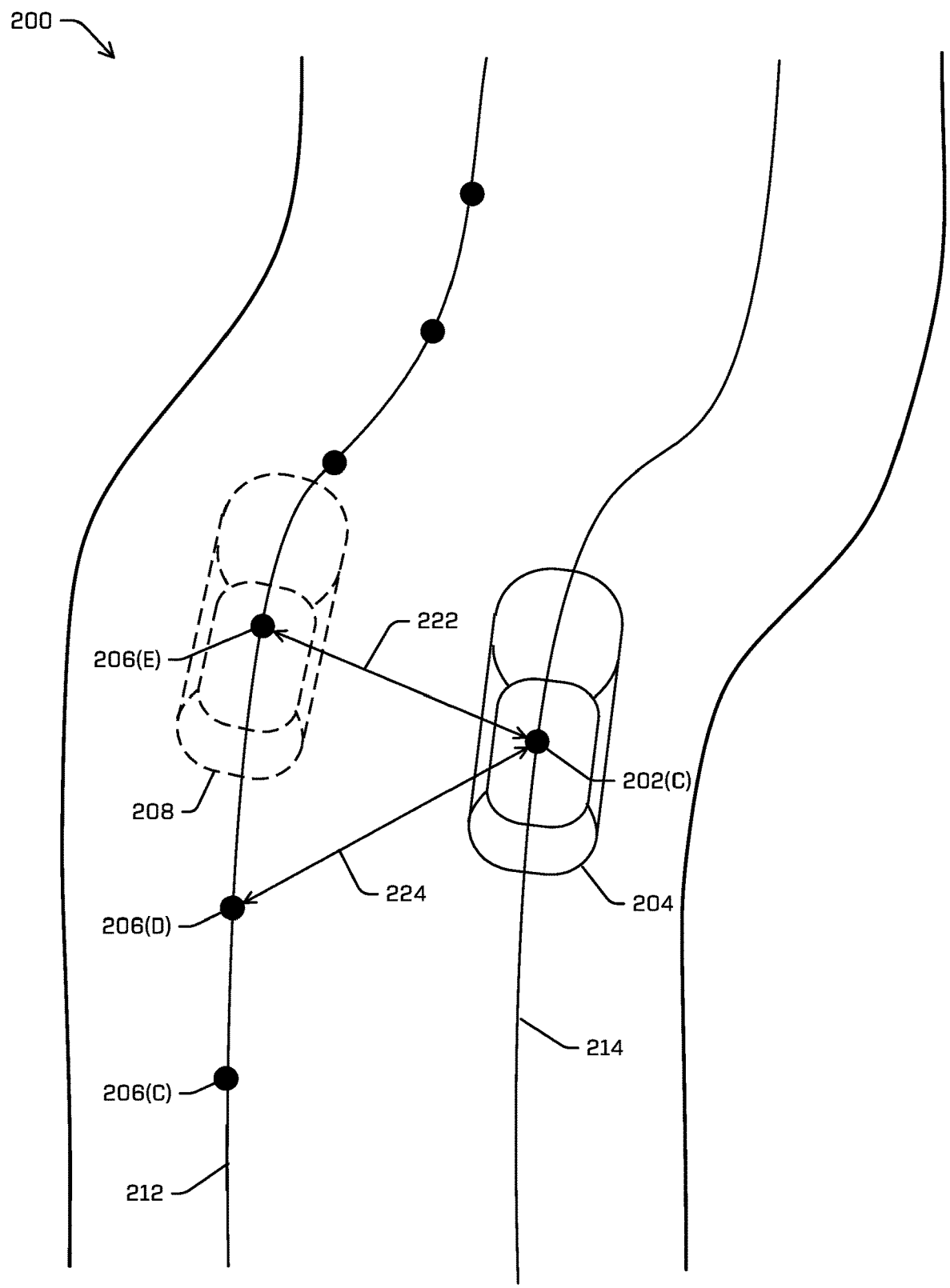
FIG. 2C depicts an example technique for determining longitudinal position errors between the first vehicle and the corresponding simulated vehicle, in accordance with one or more examples of the disclosure.
Figure 2D:
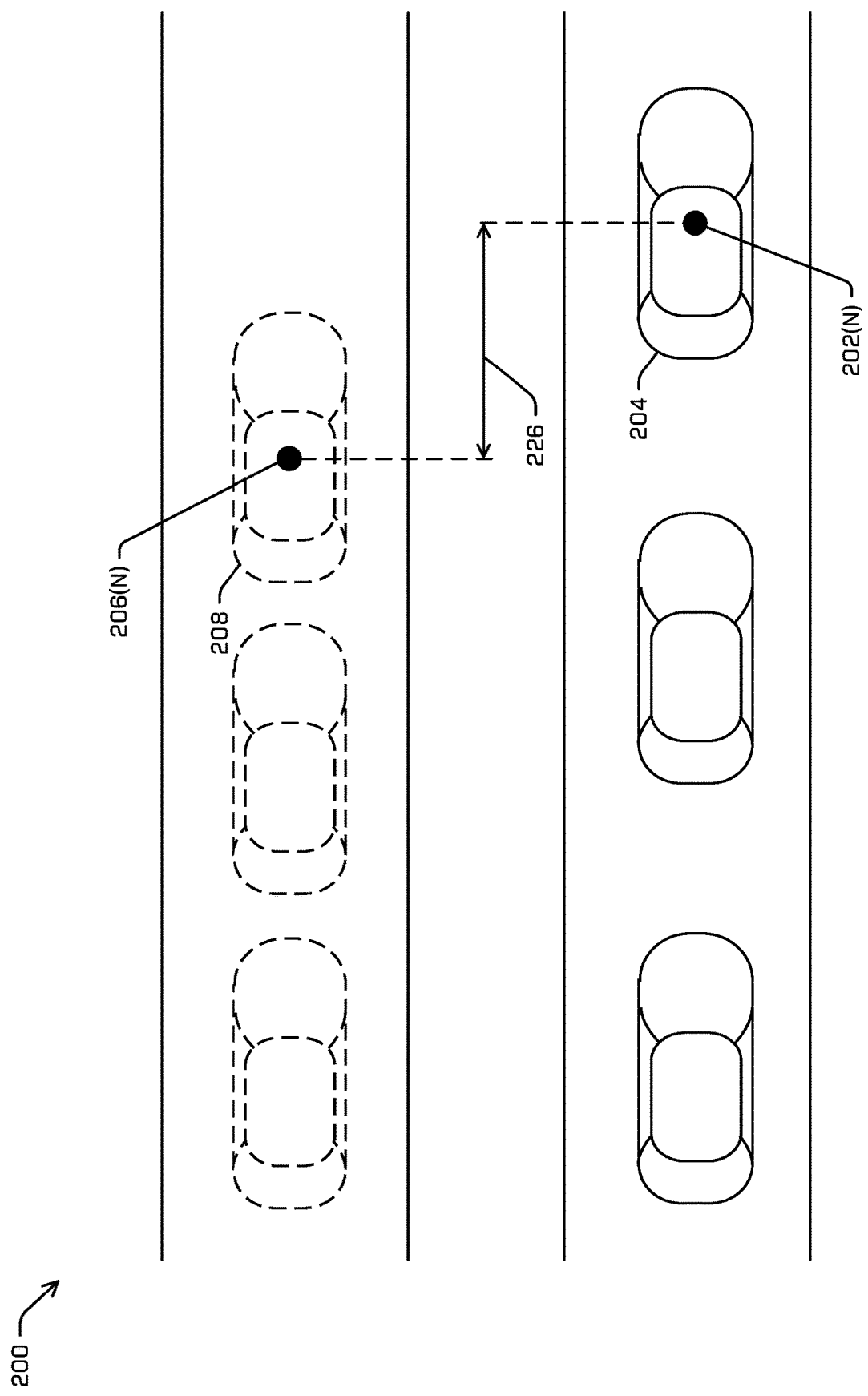
FIG. 2D depicts another example technique for determining longitudinal position errors between the first vehicle and the corresponding simulated vehicle, in accordance with one or more examples of the disclosure.

FIGS. 2C and 2D depict additional techniques for determining longitudinal position errors between the simulated vehicle 204 and the corresponding real vehicle 208. As in the previous example, the vehicles and driving paths shown in FIGS. 2C and 2D may be similar or identical to those shown in FIG. 2A, or may correspond to different vehicles and/or different trajectories.

When executing a log-based driving simulation, the initial vehicle position and state of the simulated vehicle 204 can be based on the position and state of the real vehicle 208, at a selected starting point in the log data. As the simulation progresses, the simulation system 102 may control the simulated vehicle 204 at each time point in the simulation using the same reference trajectory used by the real vehicle 208 at the corresponding time point in the log data. However, in some simulations, due to positional errors and/or velocity differences between the real and simulated vehicle, the time-synchronized positions of simulated vehicle 204 and the real vehicle 208 may diverge as the simulation continues. In such cases, to control the simulated vehicle 204 more accurately during the simulation (relative to the real vehicle 208), the simulation system 102 may determine the trajectory for the simulated vehicle 204 to follow at each time point (e.g., tick) using the reference trajectory followed by the real vehicle 208 at the spatially closest point in the positional data of the real vehicle (e.g., rather than point that corresponds temporally).

While the simulation system 102 is executing the log-based simulation, it can spatially align the trajectory used to control the simulated vehicle 204 with the trajectory of the real vehicle 208 at each successive position reach by simulated vehicle 204. To spatially align the trajectory of the simulated vehicle 104 at a point in the simulation, simulation system 102 may determine the spatially closest point reached by the real vehicle within the positional data (e.g., the log data) of the real vehicle 208. For example, as shown in FIG. 2C, when the simulated vehicle 204 reaches position 202(C) during the simulation, the simulation system 102 may determine the spatially closest point to position 202(C) in the positional data of followed by the real vehicle 208. In this case, position 206(C) in the positional data of the real vehicle 208 may be temporally the corresponding trajectory point to position 202(C), but is not spatially the closest point. Rather, the simulation system 102 may compare distance 222 and distance 224 (and/or the distances between the position 202(C) and other the positional data of the real vehicle 208) to determine that the position 206(E) is the closest point in the positional data of the real vehicle 208 to the current position 202(C) of the simulated vehicle 204. As a result, the simulation system 102 may control the simulated vehicle 204 at position 202(C), using trajectory followed by and/or control commands performed by the real vehicle 208 at position 206(E).

Using the techniques described in this example, when executing a driving simulation, the simulation system 102 may determine the trajectory for the simulated vehicle 204 to follow at each new trajectory point, based on the trajectory followed by the real vehicle 208 at its spatially closest point in the positional data. However, in various examples, the simulation system 102 may apply a number of rules and/or exceptions when applying this technique for controlling the trajectory of the simulated vehicle 204. For instance, the simulation system 102 may be configured not to go back in time and use a previous/older trajectory to control the simulated vehicle 204, although the simulation system 102 may use the same trajectory to control the simulated vehicle 204 at multiple sequential states. Additionally, in some examples the simulation system 102 may use a time threshold (e.g., 3 secs, 5 secs, etc.) to limit the set of positions in the positional data of the real vehicle 208 that are compared to the current position 202(C) of the simulated vehicle. Such a time threshold may be used to avoid the use of an incorrect trajectory caused by the real vehicle 208 traveling along a self-intersecting path.

In some examples, to determine longitudinal position errors for the simulated vehicle 204, the simulation system 102 may use different techniques than those described above for determining lateral position errors. The reasons for different techniques may include, among other reasons, that longitudinal position errors between the simulated vehicle 204 and real vehicle 208 may propagate over time during the simulation in a way that lateral position errors may not. Additionally, attempting to determine longitudinal position errors at times when the simulated vehicle 204 and the real vehicle 208 are following different trajectories may result in data inaccuracies.

To address these technical challenges and potential inaccuracies in determining longitudinal position errors, the simulation system 102 may initially identify a time interval in which both the simulated vehicle 204 and the real vehicle 208 are following the same trajectory (e.g., issuing vehicle control commands at corresponding times to attempt to drive at the same velocity, acceleration, steering angle, and yaw). Within such a time interval, the simulation system 102 may, at each time point for the simulated vehicle 204 (e.g., at each object controller processing cycle), determine the closest spatial position within the positional data of the real vehicle 208. After determining the closest position reached by the real vehicle, the simulation system 102 may use the trajectory used by the real vehicle 208 at that position to control the simulated vehicle 204. The simulation system 102 then may determine the longitudinal error divergence between the position of the simulated vehicle 204 and the corresponding position (e.g., the closest spatial position) of the real vehicle 208. In some examples, the simulation system 102 may use Equation 1 to longitudinal error divergence by integrating over the time interval where both the simulated vehicle 204 and the real vehicle 208 are following the same trajectory:

$$e_{divergence}(t, t_0) = \int_{\tau=t_0}^{\tau=t} (sim\_vx(\tau) - vehicle\_vx(\tau))d\tau \qquad \text{Equation 1}$$

In this example, $e_{divergence}$ may represent the longitudinal error divergence over the time interval between $t_0$ and t, in which the simulated vehicle 204 and the real vehicle 208 are following the same trajectory. $sim\_vx(\tau)$ represents the velocity of the simulated vehicle 204 at the time $\tau$, and $vehicle\_vx(\tau)$ represents the velocity of the real vehicle 208 at the time $\tau$. Thus, Equation 1 illustrates a technique of integrating over the difference in the velocity between the simulated vehicle 204 and the real vehicle 208 over time, to determine a measurement of longitudinal divergence. This technique thus addresses the potential problems of longitudinal error propagation (e.g., by integrating over the difference in the velocity at time intervals) and differences in trajectory (e.g., by using time intervals in which the simulated vehicle 204 and the real vehicle 208 are following the same trajectory).

In some examples, this technique may provide accurate measurements of the longitudinal divergence of the simulated vehicle 204 when the corresponding positions determined for the simulated vehicle 204 and the real vehicle 208 and are relatively spatially close. However, when the distance between corresponding positions for the simulated vehicle 204 and the real vehicle 208 meets or exceeds a distance threshold, the simulation system 102 may use an alternative technique. One such example includes situations when one or both of the simulated vehicle 204 and the real vehicle 208 stop during the time interval between $t_0$ and t, and when the vehicles stop at longitudinally different locations. In such examples, the simulation system 102 may use Equation 2, which modifies Equation 1 to account for the distance between the different stopping points of the vehicles:

$$e_{divergence}(t, t_0) = \qquad \text{Equation 2}$$
$$\int_{\tau=t_0}^{\tau=t} (sim\_vx(\tau) - vehicle\_vx(\tau))d\tau - dist(sim(t), vehicle(t))$$

In this example, Equation 2 is similar to Equation 1, but includes subtracting the term dist (sim(t), vehicle(t)) from the interval, to account for stopping events in which the simulated vehicle 204 and real vehicle 208 have different stopping distances. representing the distance between the simulated vehicle. FIG. 2D shows an example in which the simulated vehicle 204 stops at a position 202(N), the real vehicle 208 stops at different position 206(N), and the term dist (sim(t), vehicle(t)) represents the longitudinal distance 226 between the stopping positions at the time N.

Figure 3:
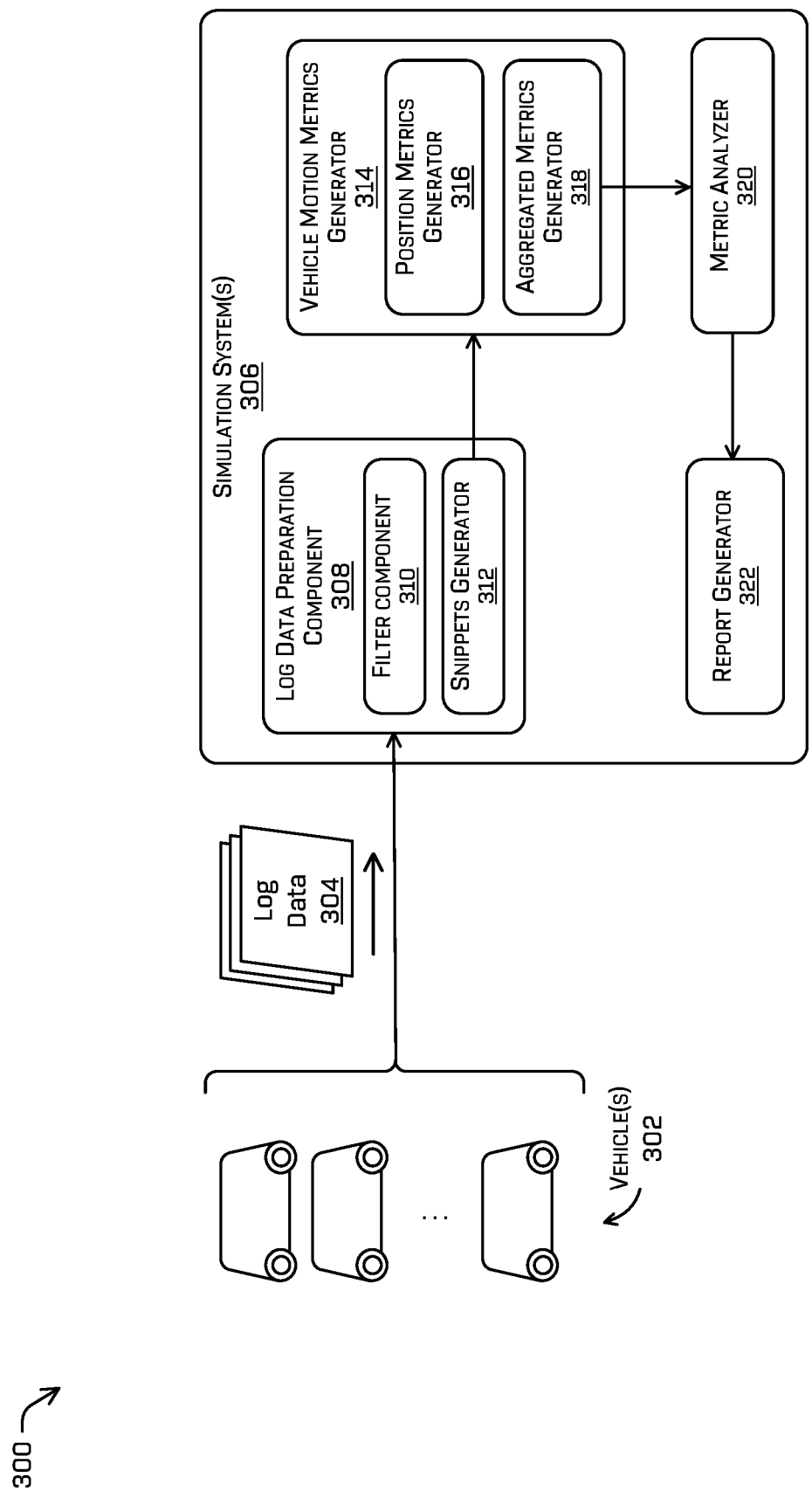
FIG. 3 includes a block diagram of an example simulation system configured to determine a position error distribution for a simulated vehicle, in accordance with one or more examples of the disclosure.

FIG. 3 is an example block diagram illustrating an example architecture 300 of a simulation system 102 configured to determine and analyze simulated vehicle position errors, and to determine a position error distribution(s) for a simulated vehicle. As discussed above, the simulation system 102 may receive vehicle log data from any number of vehicles, and may analyze the aggregated log data to determine lateral and/or longitudinal error distributions, models, and/or functions correlating the positional error with vehicle state features. In the current example, log data 304 may be received from one or more vehicles 302 operating on various roadways in real-world conditions and environments. As discussed above the log data 304 may include the vehicle position data, reference trajectory data, sensor data, perception data, prediction data, and the like.

The example computing architecture 300 includes computing system(s) associated with one or more vehicles 302, configured to provide log data 304 captured by the vehicle(s) 302 while traversing real-world driving environments. In some examples, the log data 304 may include location data captured by one or more location sensor(s) (e.g., GPS, compass, etc.) associated with a vehicle 302, inertial data captured by one or more inertial sensor(s) (e.g., inertial measurement units, accelerometers, magnetometers, gyroscopes, etc.), wheel encoder data captured by one or more wheel encoder(s), etc. In some examples, the location data captured by one or more location sensor(s) can include a trajectory, a start location associated with the trajectory, an end location associated with the trajectory, one or more waypoint(s) associated with the trajectory, a longitude position associated with a waypoint of the trajectory, a latitude position associated with the waypoint of the trajectory, etc. In some examples, the inertial data captured by one or more inertial sensor(s) can include a vehicle acceleration associated with a waypoint of the trajectory. In some examples, the wheel encoder data captured by one or more wheel encoder(s) can include a vehicle velocity associated with a waypoint of the trajectory. In some examples, the vehicle control system may be configured to receive the vehicle location, the vehicle acceleration, and/or the vehicle velocity from one or more system(s) associated with the vehicle periodically (e.g., once every second) and associate a set of timestamps with the recorded operations and positions.

In some examples, the log data 304 may be received via one other separate computing systems (not shown) representing server systems configured to receive the log data 304 from one or more vehicles 302, filter, aggregate, and forward the log data 304 to the simulation system(s) 306. In such examples, the log data 304 can include one or more trajectories associated with the vehicle(s) 302, where the vehicle(s) may be associated with various vehicle types and/or software versions. In this example, the computing architecture 300 also may include simulation system(s) 306 configured to receive the log data 304 from the vehicle(s) 302. The simulation system(s) 306 may be similar to identical to the simulation system 102 described above in FIG. 1. As illustrated in FIG. 3, the simulation system(s) 306 can include a log data preparation component 308, a vehicle motion metrics generator 314, a metric analyzer 320, and a report generation component 322.

The log data preparation component 308 can receive the log data 304 from the vehicle(s) 302 and be configured to prepare the log data 304 for processing. In some examples, the log data preparation component 308 can include a filter component 310 and a snippets generator 312.

As discussed above, the log data 304 can include a plurality of positional data and a plurality of trajectories associated with each vehicles, and the vehicles can be associated with various vehicle types and/or software versions. The filter component 310 can filter the log data 304 to determine driving paths (e.g., based on positional data) and/or the trajectories followed by the vehicles, for one or more vehicles based on a software version and/or vehicle type associated with a simulated vehicle, where one or more vehicles are associated with the same software version and/or the same vehicle type as the simulated vehicle. For example, filter component 310 can filter the log data 304 to determine first positional data representing a first driving path associated with a first vehicle, and second positional data representing a second driving path associated with a second vehicle based at least in part on the software version and/or vehicle type associated with the simulated vehicle.

The filter component 310 can pass the one or more positional data and/or trajectories associated with the simulated vehicle to a snippets generator 312. For each set of positional data and/or trajectories, the snippets generator 312 can determine a plurality of data subsets based on a set of timestamps associated with the respective positional data and/or trajectory. Each data subset of the plurality of data subsets represents a vehicle position associated with the respective trajectory at a corresponding timestamp. For example, the snippets generator 312 can determine, based on the first positional data and a first set of timestamps associated with the first trajectory, a plurality of first data subsets. Each first data subset of the plurality of first data subsets represents a vehicle position associated with the first trajectory at a corresponding timestamp. The snippets generator 312 can further determine, based on the second trajectory position data and a second set of timestamps associated with the second trajectory, a plurality of second data subsets. Each second data subset of the plurality of second data subsets represents a vehicle position associated with the second trajectory at a corresponding timestamp.

The vehicle motion metrics generator 314 can receive the plurality of data subsets associated with the set of timestamps from the snippets generator 312. In some examples, the vehicle motion metrics generator 314 includes a position metrics generator 316 and an aggregated metrics generator 318. The position metrics generator 316 may receive the plurality of data subsets associated with the set of timestamps from the snippets generator 312, and determine a plurality of lateral and/or longitudinal vehicle positions associated with the set of timestamps. For example, the position metrics generator 316 can determine, based on the plurality of first data subsets, a longitude vehicle position associated with the first trajectory at a first point in time (t=1), a latitude vehicle position associated with the first trajectory at the first point in time (t=1), a longitude vehicle position associated with the first trajectory at a second point in time (t=2), a latitude vehicle position associated with the first trajectory at the first point in time (t=2), etc. Similarly, the position metrics generator 316 can determine, based on the plurality of second data subsets, a longitude vehicle position associated with the second trajectory at the first point in time (t=1), a latitude vehicle position associated with the second trajectory at the first point in time (t=1), a longitude vehicle position associated with the second trajectory at the second point in time (t=2), a latitude vehicle position associated with the second trajectory at the first point in time (t=2), etc.

The aggregated metrics generator 318 may determine, based on the plurality of longitude vehicle positions associated with the set of timestamps and the plurality of latitude vehicle positions associated with the set of timestamps, a plurality of positions for the simulated vehicle. The plurality of positions can be associated with a set of simulation timestamps. For example, the aggregated metrics generator 318 can determine, based on the longitude vehicle position associated with the first trajectory at the first point in time (t=1) and the longitude vehicle position associated with the second trajectory at the first point in time (t=1), a simulated longitude vehicle position at the first point in time (t=1). Similarly, the aggregated metrics generator 318 can determine, based on the longitude vehicle position associated with the first trajectory at the second point in time (t=2) and the longitude vehicle position associated with the second trajectory at the second point in time (t=2), a simulated longitude vehicle position at the second point in time (t=2).

The metric analyzer 320 may receive the plurality of simulation positions from the aggregated metrics generator 318 and determine a difference between the positions of a simulated vehicle and the real vehicle. The metric analyzer 320 may further characterize a vehicle feature of the real vehicle corresponding to the difference in the positions of the simulated vehicle and the real vehicle. Examples of vehicle features can include vehicle velocity, vehicle acceleration, etc. The metric analyzer 320 may further characterize, based at least in part on the feature, a position error distribution in simulation when simulating a vehicle corresponding to the simulated vehicle. Examples of the position error distribution can include a velocity-based longitudinal position error distribution, a velocity-based lateral position error distribution, an acceleration-based position error distribution, an acceleration-based lateral position error distribution, etc.

The report generation component 322 can receive the position error distribution from the metric analyzer 320 and generate one or more reports including the corresponding of the vehicle features (e.g., velocity, acceleration, steering angle, etc.) to the determined position error data (e.g., aggregated longitudinal and/or lateral position errors). The reports generated correlating position errors with a vehicle feature (e.g., a vehicle velocity, a vehicle acceleration, etc.) may provide advantages when executing subsequent simulations, including performing targeted simulation testing (e.g., increasing simulation accuracy) and may reduce the memory and computing consumption. For instance, during execution of a subsequent simulation, a simulation system may receive a current feature (e.g., a vehicle velocity, a vehicle acceleration) associated with a vehicle and generate bounding box information associated with the vehicle based on the position error distribution and the current feature associated with the vehicle. For example, the simulation system can receive a current vehicle velocity associated with the vehicle and determine a longitudinal position error and/or a lateral position error based on the current vehicle velocity and a velocity-based position error distribution, and can generate bounding box information associated with the vehicle based on the determined longitudinal position error and/or the determined lateral position error.

Figure 4:
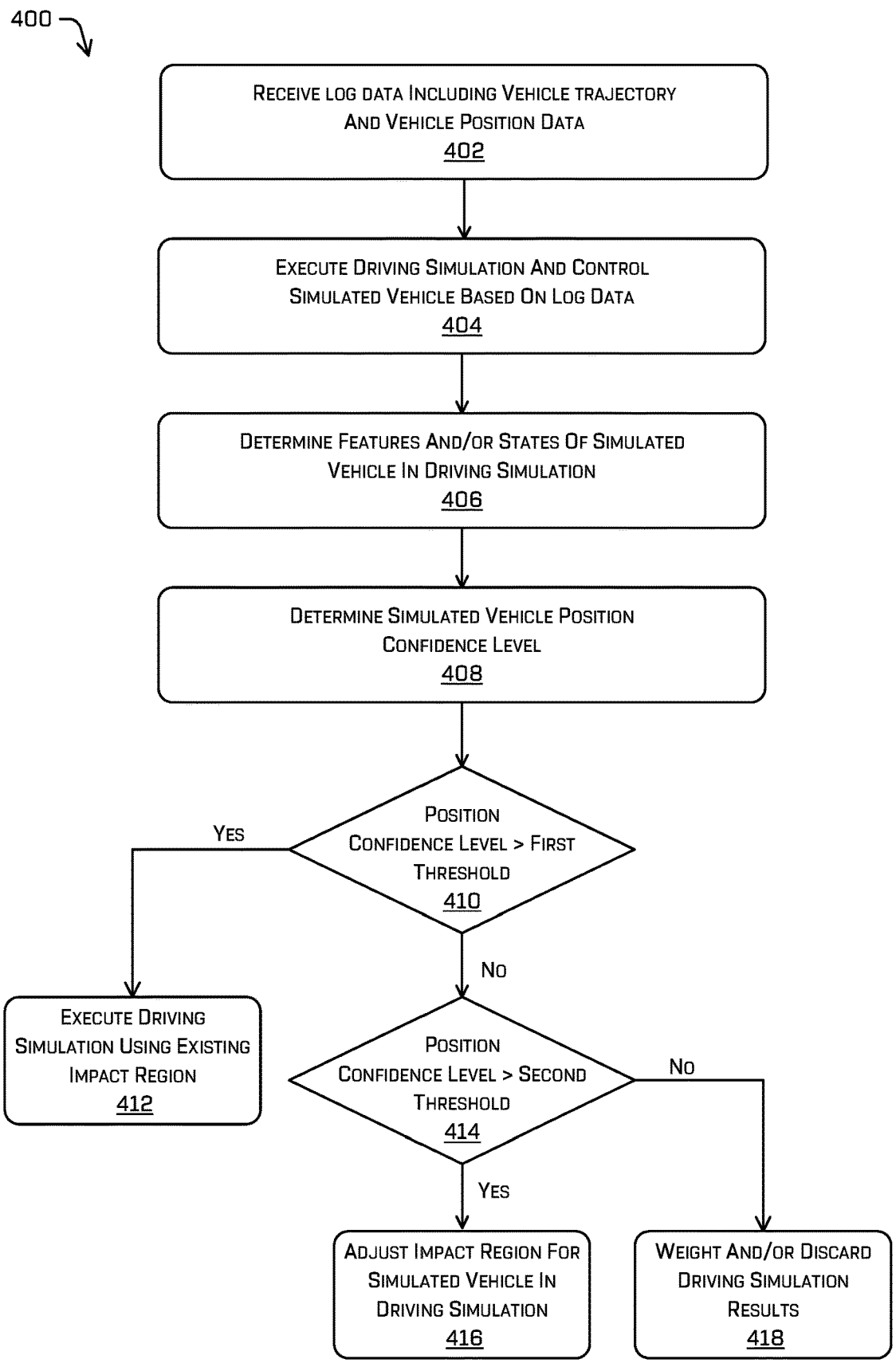
FIG. 4 illustrates an example process of determining a position error distribution of a simulated vehicle during a driving simulation, in accordance with one or more examples of the disclosure.

FIG. 4 illustrates an example process 400 for determining a position error distribution of a simulated vehicle during a driving simulation. As described below, some or all of the operations described in process 400 can be performed by components discussed above in FIGS. 1-3, such as the simulation system 102.

At operation 402, the simulation system 102 may receive log data comprising position data and/or trajectory associated with a real vehicle traversing a real-world driving environment. The log data may include position data for the real vehicle in a number of time points over a time period in a real environment. In some examples, the log data can include data indicating vehicle type, software version, vehicle positions, vehicle velocities, vehicle accelerations, or the like over time during the course of individual trips.

At operation 404, the simulation system 102 may execute a driving simulation, including a simulated vehicle, controlled by a planner component based at least in part on the log data received in operation 402. In some examples, the simulated vehicle may follow a simulation trajectory based on the trajectory of the real vehicle, and may record simulated vehicle position/state at periodic time points (or time steps) during the simulation. In some examples, the simulated vehicle can follow a simulation trajectory corresponding to a previous trajectory for the real vehicle. Alternatively or additionally, in some examples, the simulated vehicle can follow a simulation trajectory that is generated based at least in part on the two or more previous trajectories for the real vehicle.

At operation 406, the simulation system 102 may determine vehicle state features associated with the simulated vehicle at various times during the driving simulation. The vehicle state features may include, for example, vehicle states (e.g., velocities, accelerations, steering angles, etc.) and/or vehicle attributes (e.g., vehicle types, models, software versions, etc.). As described below in more detail, the simulation system 102 may be configured to analyze simulation vehicle positional errors and to correlate the positional errors with one or a combination of the vehicle state features.

At operation 408, the simulation system 102 may determine differences (e.g., errors) between the positions of the simulated vehicle during the simulation, and the corresponding positions of the real vehicle from which the log data was captured. As described above, the positional error may be determined separately using separate techniques for lateral and/or longitudinal components. To determine the lateral and longitudinal position errors for a simulated vehicle, the simulation system 102 may compare the current position of the simulated vehicle at one or more time steps during the simulation to the corresponding (e.g., spatially and/or temporally aligned) positions of the real vehicle within the log data. In some examples, operation 408 may include determining position error distributions, models, and/or functions that correlate the vehicle state features (e.g., velocity, acceleration, steering angle, etc.) to simulated vehicle position confidence values, which may refer to values indicating the degree of confidence of the positions of simulated vehicle in the simulation based on the corresponding vehicle state features.

In this example, operations 410-418 may be associated with the control and evaluation of the same driving simulation described above in operations 402-408, or may be associated with a subsequent driving simulation that can be generated, executed, and/or evaluated based position confidence level(s) (e.g., distributions, functions, and/or models) determined in operation 408.

At operation 410, the simulation system 102 may determine whether the position confidence level determined for the driving simulation (which may include a lateral and/or a longitudinal position confidence component) exceeds a first confidence level threshold. If so (410: Yes), the simulation system 102 may proceed to execute the driving simulation under normal (e.g., unmodified) conditions. However, if the position confidence level does not exceed the first threshold (410: No), then in this example, the simulation system 102 may compare the same position confidence level(s) to a second confidence level threshold in operation 414. If the position confidence level(s) meet or exceed the second confidence level threshold (414: Yes), then in operation 416 the simulation system 102 may modify the execution and/or evaluation of the simulation by adjusting the impact region for the simulated vehicle. As described above, in other examples, the simulation system 102 may perform any number of additional modifications to the generation, execution, and/or evaluation of the driving simulations based on the predicted positions and/or confidence levels. In this example, if the position confidence level(s) do not meet or exceed the second confidence level threshold (414: No), then in operation 418, the simulation system 102 may perform a different modification to the execution and/or evaluation of the simulation. In this example, in operation 418, the simulation system 102 may down weight and/or discard the simulation results based on the confidence level(s) of the simulated vehicle positions being below the first and second threshold.

Figures 5A, 5B:
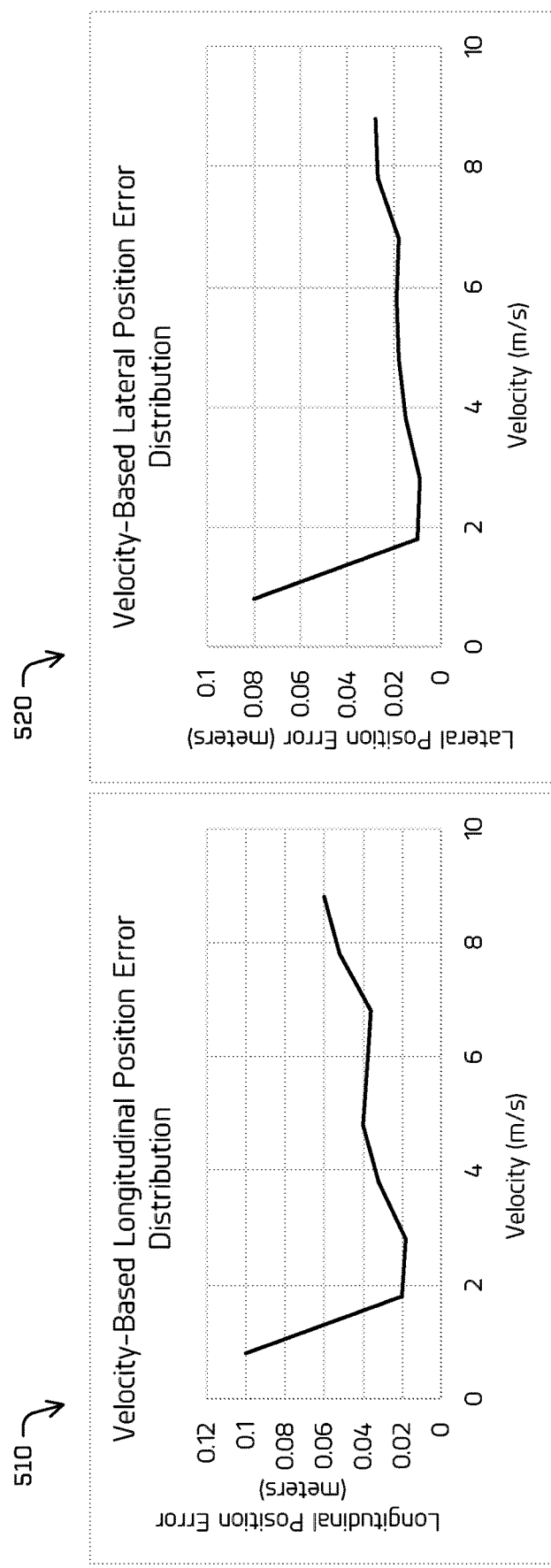
FIGS. 5A and 5B are example graphs illustrating relationships between vehicle velocity and position error distributions, in accordance with one or more examples of the disclosure.

FIGS. 5A and 5B illustrate examples of position error distributions. FIG. 5A illustrates an example of a velocity-based longitudinal position error distribution plot 510. FIG. 5B illustrates an example of a velocity-based lateral position error distribution plot 520.

Figure 6:
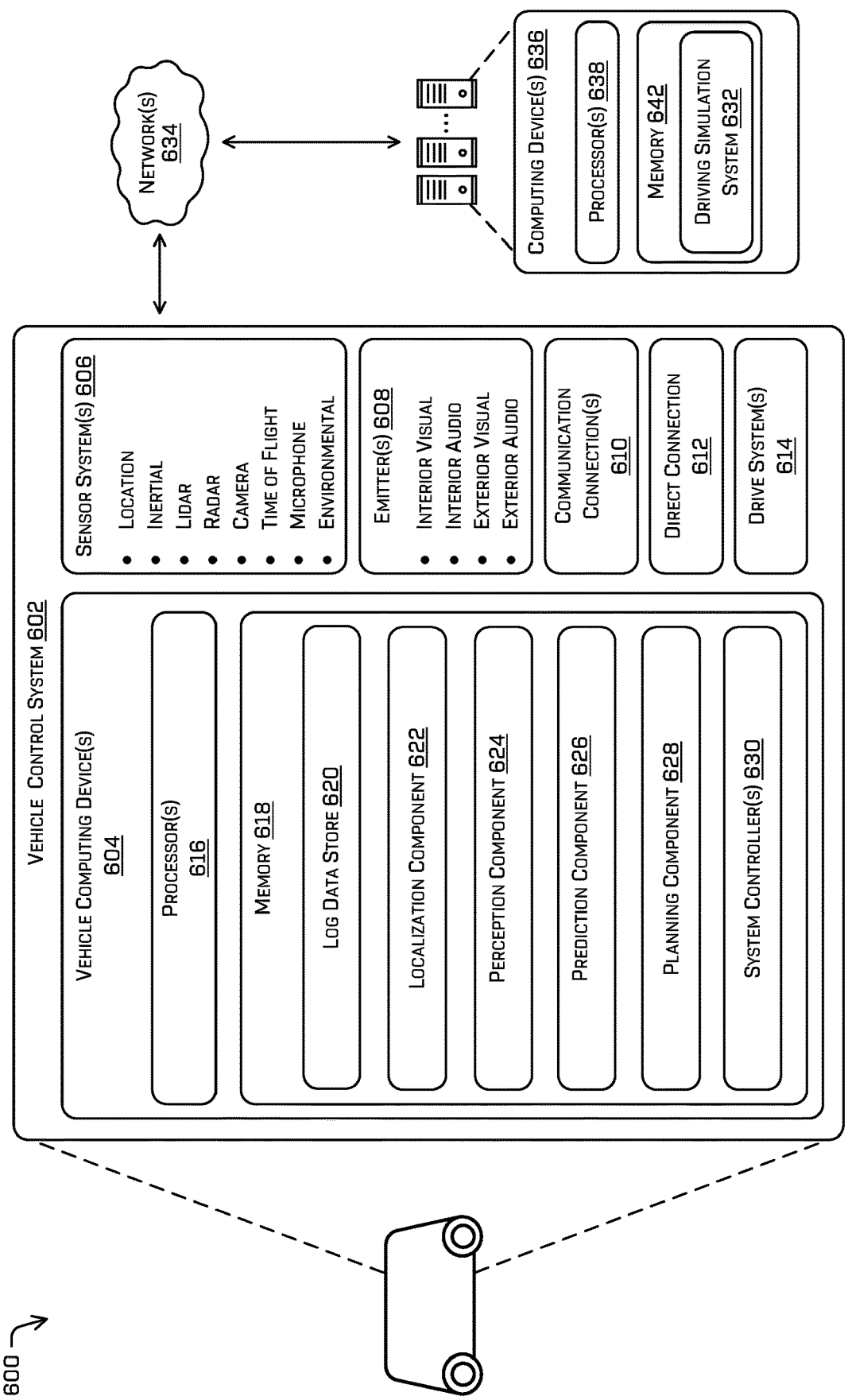
FIG. 6 includes a block diagram of an example architecture of a vehicle control system and a simulation system for performing driving simulations, in accordance with one or more examples of the disclosure.

FIG. 6 illustrates an example computing environment 600 that may be used to implement the driving simulation systems according to the techniques described herein. The computing environment 600 may include a vehicle control system 602 and one or more computing device(s) 636. The vehicle control system 602 may include various software-based and/or hardware-based components of an autonomous vehicle, and may be used to control autonomous vehicles traversing through physical environments and/or simulated vehicles operating within virtual and/or log-based simulations.

In this example, the vehicle control system 602 and the computing device(s) 636 and are illustrated as discrete computing systems communicating over one or more networks 634, although in other implementations the functionality of each of the systems 602, 636, may be carried out in the same computing environment. By way of non-limiting example, software executing the functionality of the vehicle control system 602 may be uploaded or otherwise incorporated into the computing device(s) 636 and/or software executing the computing device(s) 636 may be uploaded to or otherwise made incorporated into the vehicle control system 602.

The vehicle control system 602 can be a hardware-based and/or software-based controller for a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some instances, the vehicle control system 602 may operate within a real associated vehicle, such as a fully or partially autonomous vehicle having any other level or classification. In some instances, the techniques described herein may be usable by non-autonomous vehicles as well. Additionally or alternatively, the vehicle control system 602 may operate independently from any vehicle, for example, as a hardware and software-based controller for a simulated vehicle executing in a computing environment during the development, testing, and validation processes for the vehicle control system 602. In addition, while implementations of the vehicle control system 602 described herein may include simulating a control system of an autonomous vehicle, semi-autonomous vehicle, or a non-autonomous vehicle, some of the techniques may be in a simulated environment, using a simulated vehicle.

The vehicle control system 602 can be used for any configuration of real or simulated vehicles, such as, for example, a van, a sport utility vehicle, a cross-over vehicle, a truck, a bus, an agricultural vehicle, and/or a construction vehicle. For instance, the associated vehicle for the vehicle control system 602 can be powered by one or more internal combustion engines, one or more electric motors, hydrogen power, any combination thereof, and/or any other suitable power sources. Although the associated vehicle may have four wheels, the vehicle control system 602 and associated techniques described herein can be incorporated into vehicles having fewer or a greater number of wheels, and/or tires. The vehicle control system 602 can control vehicles having four-wheel steering and can operate generally with equal or similar performance characteristics in all directions, for example, such that a first end of the vehicle is the front end of the vehicle when traveling in a first direction, and such that the first end becomes the rear end of the vehicle when traveling in the opposite direction. Similarly, a second end of the vehicle is the front end of the vehicle when traveling in the second direction, and such that the second end becomes the rear end of the vehicle when traveling in the opposite direction. These example characteristics may facilitate greater maneuverability, for example, in small spaces or crowded environments, such as parking lots and/or urban areas.

The vehicle control system 602 can include a computing device(s) 604, one or more sensor system(s) 606, one or more emitter(s) 608, one or more communication connection(s) 610 (also referred to as communication devices and/or modems), at least one direct connection 612 (e.g., for physically coupling with the vehicle to exchange data and/or to provide power), and one or more drive system(s) 614. The one or more sensor system(s) 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of each of these or other types of sensors. For instance, the time-of-flight sensors can include individual time-of-flight sensors located at the corners, front, back, sides, and/or top of the real or simulated vehicle associated with the vehicle control system 602. As another example, the camera sensors can include multiple cameras disposed at various locations about the exterior and/or interior of the associated real or simulated vehicle. The sensor system(s) 606 can provide input to the computing device(s) 604.

The vehicle control system 602 can also include one or more emitter(s) 608 for controller the emitting of light and/or sound via the real or simulated vehicle associated with the vehicle control system 602. The one or more emitter(s) 608 in this example include interior audio and visual emitters to communicate with passengers of the vehicle. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 608 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle control system 602 can also include one or more communication connection(s) 610 that enable communication between the vehicle control system 602 and one or more other local or remote computing device(s) (e.g., a remote teleoperations computing device) or remote services. For instance, the communication connection(s) 610 can facilitate communication with other local computing device(s) on the associated real or simulated vehicle, and/or the drive system(s) 614. Also, the communication connection(s) 610 can allow the vehicle to communicate with other nearby computing device(s) (e.g., other nearby vehicles, traffic signals, etc.).

The communications connection(s) 610 can include physical and/or logical interfaces for connecting the computing device(s) 604 to another computing device or one or more external networks (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s). In at least some examples, the communication connection(s) 610 may comprise the one or more modems as described in detail above.

In at least one example, the vehicle control system 602 can include one or more drive system(s) 614. In some examples, the real or simulated vehicle associated with the vehicle control system 602 can have a single drive system 614. In at least one example, if the vehicle has multiple drive systems 614, individual drive systems 614 can be positioned on opposite ends of the associated vehicle (e.g., the front and the rear, etc.). In at least one example, the drive system(s) 614 can include one or more sensor system(s) 606 to detect conditions of the drive system(s) 614 and/or the surroundings of the vehicle. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle control system 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more modules to perform various functionalities of the drive system(s) 614. Furthermore, the drive system(s) 614 also include one or more communication connection(s) that enable communication by the respective drive system with one or more other local or remote computing device(s).

The computing device(s) 604 within the vehicle control system 602 can include one or more processor(s) 616 and memory 618 communicatively coupled with the one or more processor(s) 616. In the illustrated example, the memory 618 of the vehicle computing device(s) 604 includes log data store 620, a localization component 622, a perception component 624, a prediction component 626, a planning component 628, and one or more system controller(s) 630. Though depicted as residing in the memory 618 for illustrative purposes, it is contemplated that the localization component 622, the perception component 624, the prediction component 626, the planning component 628, and the one or more system controller(s) 630 can additionally, or alternatively, be accessible to the computing device(s) 604 (e.g., stored in a different component of vehicle control system 602 and/or stored remotely and accessible to the vehicle control system 602.

The log data store 620 can include map data, vehicle type, software version, vehicle positions, vehicle velocities, vehicle accelerations, or the like overtime during the course of individual trips. In some examples, the log data store 620 can further include raw sensor data and/or data based on sensor data detected at the plurality of vehicles, for example, data identifying characteristics of the environment in which a vehicle was operated, objects within the proximity of the vehicle, attributes or characteristics of the environment and objects (e.g., classifications, sizes, shapes, positions, trajectories, etc.).

The localization component 622 can include functionality to receive data from the sensor system(s) 606 to determine a position of the real vehicle associated with the vehicle control system 602. For example, the localization component 622 can include and/or request/receive a three-dimensional map of the real environment and can continuously determine a location of the autonomous vehicle within the map. In some instances, the localization component 622 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle.

The perception component 624 can include functionality to perform object detection, segmentation, and/or classification. In some examples, the perception component 624 can provide processed sensor data that indicates a presence of an entity that is proximate to the real or simulated vehicle associated with the vehicle control system 602 and/or a classification of the entity as an entity type (e.g., car, pedestrian, cyclist, building, tree, road surface, curb, sidewalk, unknown, etc.). In additional and/or alternative examples, the perception component 624 can provide processed sensor data that indicates one or more characteristics associated with a detected entity and/or the real or simulated environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The prediction component 626 can receive sensor data from the sensor system(s) 606, map data, and/or perception data output from the perception component 624 (e.g., processed sensor data), and can output predictions associated with one or more objects within the environment of the autonomous vehicle. Predictions can include predicted trajectories associated with objects in the environment in which the autonomous vehicle is operating.

The planning component 628 can determine a path for the vehicle control system 602 to direct the real vehicle through a real environment. For example, the planning component 628 can determine various routes and paths and various levels of detail. In some instances, the planning component 628 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 628 can generate an instruction for guiding the autonomous vehicle along at least a portion of the route from the first location to the second location. In at least one example, the planning component 628 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 628 can alternatively, or additionally, use data from the perception component 624 to determine a path for the real vehicle associated with the vehicle control system 602 to follow to traverse through an environment. For example, the planning component 628 can receive data from the perception component 624 regarding objects associated with an environment. Using this data, the planning component 628 can determine a route to travel from a first location (e.g., a current location) to a second location (e.g., a target location) to avoid objects in an environment. In at least some examples, such a planning component 628 may determine there is no such collision free path and, in turn, provide a path which brings the vehicle to a safe stop avoiding all collisions and/or otherwise mitigating damage.

The computing device(s) 636 can receive log data from the vehicle control system 602 and drive simulations based at least in part on the log data. Although not shown in this example, the computing device(s) 636 also may include log data store(s) similar or identical to the log data store 620. The computing device(s) 636 may include one or more processors 638 and memory 642 communicatively coupled with the one or more processors 638. In the illustrated example, the memory 642 of the computing device(s) 636 stores a driving simulation system 632.

In some examples, the log data can include trajectories associated with a plurality of vehicles with various software versions and/or various vehicle types. To generate driving simulations for a simulated vehicle, the driving simulation system 632 can determine one or more trajectories from the plurality of vehicle trajectories based on vehicle data associated with a simulated vehicle. Example of vehicle data can include, but are not limited to, first data indicating a software version associated with the simulated vehicle, second data indicating a vehicle type associated with the simulated vehicle. For example, the driving simulation system 632 can filter the log data to determine one or more trajectories for a real vehicle based on the software version and/or the vehicle type associated with simulated vehicle, where the real vehicle is associated with the same software version and/or the same vehicle type as the simulated vehicle.

The driving simulation system 632 can further control a simulated vehicle based at least in part on the log data, where the simulated vehicle follows a simulation trajectory in a simulated environment. In some examples, the simulated vehicle can follow a simulation trajectory corresponding to a previous trajectory for the real vehicle.

Alternatively or additionally, in some examples, the driving simulation system 632 can control the simulated vehicle to follow a simulation trajectory that is generated based at least in part on the two or more previous trajectories for the real vehicle. For example, the log data can include a first trajectory from a first location to a second location at a first time and a second trajectory for the real vehicle from the first location to the second location at a second time. The driving simulation system 632 can generate the simulation trajectory based at least in part on the first trajectory and the second trajectory. For example, the driving simulation system 632 can determine, based on a first set of timestamps associated with the first trajectory, a plurality of first data subsets representing position data associated with the real vehicle when traveling the first trajectory. The driving simulation system 632 can determine, based on a second set of timestamps associated with the second trajectory, a plurality of second data subsets representing position data associated with the real vehicle when traveling the second trajectory. The driving simulation system 632 can further determine, based on the plurality of first data subsets and the plurality of second data subsets, a plurality of positions of the simulated vehicle.

In some examples, the driving simulation system 632 can determine a difference between the positions of the simulated vehicle in the simulated environment and the real vehicle in the real environment. The position of the real vehicle can be determined based at least in part on the log data. The difference between the positions of the simulated vehicle and the real vehicle can include a longitudinal position error and/or a lateral position error.

In some examples, the driving simulation system 632 can characterize a feature of the real vehicle corresponding to the difference in the positions of the simulated vehicle and the real vehicle. For example, the feature of the real vehicle can include a vehicle velocity associated with the real vehicle. As another example, the feature of the real vehicle can include a vehicle acceleration associated with the real vehicle.

In some examples, the driving simulation system 632 can further characterize, based at least in part on the feature, a position error distribution in simulation when simulating a vehicle corresponding to the simulated vehicle. The position error distribution can be velocity-based or acceleration-based and can include longitudinal position error distribution and/or a lateral position error distribution. For example, the driving simulation system 632 can determine, based on the vehicle velocity associated with the real vehicle and the difference in the positions of the simulated vehicle and the real vehicle, a velocity-based position error distribution. As another example, the driving simulation system 632 can determine, based on the vehicle acceleration associated with the real vehicle and the difference in the positions of the simulated vehicle and the real vehicle, an acceleration-based position error distribution.

In some examples, characterizing the feature of the real vehicle includes determining a plurality of positions of the simulated vehicle based on a set of simulation timestamps associated with the simulation trajectory and determining a plurality of positions of the real vehicle based on a set of timestamps associated with the trajectory for the real vehicle. Characterizing the position error distribution in simulation is further based on the plurality of positions of the simulated vehicle and the plurality of positions of the real vehicle.

In some examples, the driving simulation system 632 can receive a current feature associated with a vehicle and generate bounding box information associated with the vehicle based on the position error distribution and the current feature associated with the vehicle. For example, the driving simulation system 632 can receive a current vehicle velocity associated with the vehicle and determine a longitudinal position error and/or a lateral position error based on the current vehicle velocity and the velocity-based position error distribution. The driving simulation system 632 can generate bounding box information associated with the vehicle based on the determined longitudinal position error and/or the determined lateral position error. The driving simulation system 632 can further simulate, based at least in part on the bounding box information, a second simulation trajectory for the vehicle.

The processor(s) 616 of the computing device(s) 604 and the processor(s) 638 of the simulation system 632 can be any suitable processor capable of executing instructions to process data and perform operations as described herein. By way of example and not limitation, the processor(s) 616 and 638 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 618 of the computing device(s) 604, and the memory 642 of the simulation system 632 are examples of non-transitory computer-readable media. The memory 618 and 642 can store an operating system and one or more software applications, instructions, programs, and/or data to implement the methods described herein and the functions attributed to the various systems. In various implementations, the memory 618 and 642 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, any or all of the components within the memory 618 and memory 642 can be implemented as a neural network.

EXAMPLE CLAUSES

A. A system comprising: one or more processors; and non-transitory computer-readable media storing instructions that when executed by the one or more processors, cause the system to perform operations comprising: receiving log data associated with an operation of a vehicle in a physical environment, wherein the log data includes a trajectory associated with the vehicle over a time period in the physical environment, and position data associated with the vehicle over the time period; executing a driving simulation, wherein executing the driving simulation comprises controlling a simulated vehicle in a simulated environment over a simulation time period, based at least in part on the trajectory associated with the vehicle; receiving simulation data associated with the driving simulation, wherein the simulation data includes simulation position data associated with the simulated vehicle in the simulated environment; determining, based at least in part on the position data associated with the vehicle and the simulation position data associated with the simulated vehicle, a lateral position error associated with the driving simulation; determining, based at least in part on the position data associated with the vehicle and the simulation position data associated with the simulated vehicle, a longitudinal position error associated with the driving simulation; and determining an impact region associated with a second simulated vehicle in a subsequent driving simulation, based at least in part on the lateral position error and the longitudinal position error.

B. The system of paragraph A, wherein determining the lateral position error associated with the driving simulation comprises: determining, based at least in part on the log data, a first position of the vehicle in the physical environment; determining, based at least in part on the simulation data, a first simulation position of the simulated vehicle in the simulated environment, wherein the first simulation position is longitudinally aligned with the first position; and determining a lateral distance between the first position and the first simulation position.

C. The system of paragraph A, wherein determining the longitudinal position error associated with the driving simulation comprises: determining a first velocity difference between the vehicle at a first time during the time period, and the simulated vehicle at a first simulation time associated with the first time; determining a second velocity difference between the vehicle at a second time during the time period, and the simulated vehicle at a second simulation time associated with the second time; and computing a velocity difference integral between the vehicle and the simulated vehicle, based at least in part on the first velocity difference and the second velocity difference.

D. The system of paragraph C, wherein determining the longitudinal position error associated with the driving simulation further comprises: determining, based at least in part on the log data, a stopping time and an associated stopping position of the vehicle in the physical environment; determining a simulation position of the simulated vehicle in the simulated environment, at a simulation time associated with the stopping time; determining a longitudinal distance between the stopping position of the vehicle and the simulation position of the simulated vehicle; and subtracting the longitudinal distance from the velocity difference integral.

E. The system of paragraph A, the operations further comprising: determining, based at least in part on at least one of the lateral position error or the longitudinal position error, a position error distribution associated with the driving simulation; and determining, based at least in part on the log data, a vehicle feature of the vehicle associated with the position error distribution.

F. The system of paragraph E, the operations further comprising: executing a second driving simulation, comprising controlling a second simulated vehicle in a second simulated environment; determining a simulated vehicle feature associated with the second simulated vehicle; and determining a second impact region associated with the second simulated vehicle, based at least in part on the simulated vehicle feature and the position error distribution.

G. A method comprising: receiving log data associated with an operation of a vehicle in a physical environment, wherein the log data includes a trajectory associated with the vehicle over a time period in the physical environment, and position data associated with the vehicle over the time period; executing a driving simulation, wherein executing the driving simulation comprises controlling a simulated vehicle in a simulated environment over a simulation time period, based at least in part on the trajectory associated with the vehicle; receiving simulation data associated with the driving simulation, wherein the simulation data includes simulation position data associated with the simulated vehicle in the simulated environment; determining, based at least in part on the position data associated with the vehicle and the simulation position data associated with the simulated vehicle, a position error associated with the driving simulation; and executing a subsequent driving simulation, based at least in part on the position error.

H. The method of paragraph G, wherein executing the driving simulation comprises: determining, at a first time in the driving simulation, a first position of the simulated vehicle; determining, based at least in part on the log data, a spatially closest vehicle position of the vehicle to the first position of the simulated vehicle; determining, as the trajectory, a trajectory of the vehicle associated with the spatially closest vehicle position; and controlling the simulated vehicle, at the first time, based at least in part on the trajectory of the vehicle associated with the spatially closest vehicle position.

I. The method of paragraph G, wherein determining the position error associated with the driving simulation comprises: determining, based at least in part on the log data, a first position of the vehicle in the physical environment; determining, based at least in part on the simulation data, a first simulation position of the simulated vehicle in the simulated environment, wherein the first simulation position is longitudinally aligned with the first position; and determining a lateral distance between the first position and the first simulation position.

J. The method of paragraph G, wherein determining the position error associated with the driving simulation comprises: determining a first velocity difference between the vehicle at a first time during the time period, and the simulated vehicle at a first simulation time associated with the first time; determining a second velocity difference between the vehicle at a second time during the time period, and the simulated vehicle at a second simulation time associated with the second time; and computing a velocity difference integral between the vehicle and the simulated vehicle, based at least in part on the first velocity difference and the second velocity difference.

K. The method of paragraph J, wherein determining the position error associated with the driving simulation further comprises: determining, based at least in part on the log data, a stopping time and an associated stopping position of the vehicle in the physical environment; determining a simulation position of the simulated vehicle in the simulated environment, at a simulation time associated with the stopping time; determining a longitudinal distance between the stopping position of the vehicle and the simulation position of the simulated vehicle; and subtracting the longitudinal distance from the velocity difference integral.

L. The method of paragraph G, further comprising: determining, based at least in part on the position error, a position error distribution associated with the driving simulation; and determining, based at least in part on the log data, a vehicle feature of the vehicle associated with the position error distribution.

M. The method of paragraph L, further comprising: executing a second driving simulation, comprising controlling a second simulated vehicle in a second simulated environment; determining a simulated vehicle feature associated with the second simulated vehicle; and determining a second impact region associated with the second simulated vehicle, based at least in part on the simulated vehicle feature and the position error distribution.

N. One or more non-transitory computer-readable media storing instructions executable by one or more processors, wherein the instructions, when executed, cause the one or more processors to perform operations comprising: receiving log data associated with an operation of a vehicle in a physical environment, wherein the log data includes a trajectory associated with the vehicle over a time period in the physical environment, and position data associated with the vehicle over the time period; executing a driving simulation, wherein executing the driving simulation comprises controlling a simulated vehicle in a simulated environment over a simulation time period, based at least in part on the trajectory associated with the vehicle; receiving simulation data associated with the driving simulation, wherein the simulation data includes simulation position data associated with the simulated vehicle in the simulated environment; determining, based at least in part on the position data associated with the vehicle and the simulation position data associated with the simulated vehicle, a position error associated with the driving simulation; and executing a subsequent driving simulation, based at least in part on the position error.

O. The one or more non-transitory computer-readable media of paragraph N, wherein executing the driving simulation comprises: determining, at a first time in the driving simulation, a first position of the simulated vehicle; determining, based at least in part on the log data, a spatially closest vehicle position of the vehicle to the first position of the simulated vehicle; determining, as the trajectory, a trajectory of the vehicle associated with the spatially closest vehicle position; and controlling the simulated vehicle, at the first time, based at least in part on the trajectory of the vehicle associated with the spatially closest vehicle position.

P. The one or more non-transitory computer-readable media of paragraph N, wherein determining the position error associated with the driving simulation comprises: determining, based at least in part on the log data, a first position of the vehicle in the physical environment; determining, based at least in part on the simulation data, a first simulation position of the simulated vehicle in the simulated environment, wherein the first simulation position is longitudinally aligned with the first position; and determining a lateral distance between the first position and the first simulation position.

Q. The one or more non-transitory computer-readable media of paragraph N, wherein determining the position error associated with the driving simulation comprises: determining a first velocity difference between the vehicle at a first time during the time period, and the simulated vehicle at a first simulation time associated with the first time; determining a second velocity difference between the vehicle at a second time during the time period, and the simulated vehicle at a second simulation time associated with the second time; and computing a velocity difference integral between the vehicle and the simulated vehicle, based at least in part on the first velocity difference and the second velocity difference.

R. The one or more non-transitory computer-readable media of paragraph Q, wherein determining the position error associated with the driving simulation further comprises: determining, based at least in part on the log data, a stopping time and an associated stopping position of the vehicle in the physical environment; determining a simulation position of the simulated vehicle in the simulated environment, at a simulation time associated with the stopping time; determining a longitudinal distance between the stopping position of the vehicle and the simulation position of the simulated vehicle; and subtracting the longitudinal distance from the velocity difference integral.

S. The one or more non-transitory computer-readable media of paragraph N, the operations further comprising: determining, based at least in part on the position error, a position error distribution associated with the driving simulation; and determining, based at least in part on the log data, a vehicle feature of the vehicle associated with the position error distribution.

T. The one or more non-transitory computer-readable media of paragraph S, the operations further comprising: executing a second driving simulation, comprising controlling a second simulated vehicle in a second simulated environment; determining a simulated vehicle feature associated with the second simulated vehicle; and determining a second impact region associated with the second simulated vehicle, based at least in part on the simulated vehicle feature and the position error distribution.

U. A system comprising: one or more processors; and one or more non-transitory computer-readable media storing computer-executable instructions that, when executed, cause the system to perform operations comprising: receiving log data associated with an operation of a vehicle over a time period in a physical environment, the log data including: a first state of the vehicle at a first time in the physical environment, the first state including a first recorded position of the vehicle at the first time and a first trajectory followed by the vehicle at the first time; and a second state of the vehicle at a second time in the physical environment, the second state including a second recorded position of the vehicle at the second time and a second trajectory followed by the vehicle at the second time; executing a simulation based at least in part on the log data, including controlling a simulated vehicle in a simulated environment, wherein the simulated environment is based at least in part on the physical environment; determining, at a time in the simulation, a position of the simulated vehicle in the simulated environment; determining a first distance between the position of the simulated vehicle and the first recorded position of the vehicle; determining a second distance between the position of the simulated vehicle and the second recorded position of the vehicle; determining, based at least in part on the first distance and the second distance, a spatially closest vehicle state to the position of the simulated vehicle; determining, based at least in part on the spatially closest vehicle state, a trajectory for controlling the simulated vehicle; and controlling the simulated vehicle, at the time in the simulation, using the determined trajectory.

V. The system of paragraph U, the operations further comprising: determining a first time difference between the first time of the first state and the time in the simulation; determining a second time difference between the second time of the second state and the time in the simulation; determining the first state as the spatially closest vehicle state to the position of the simulated vehicle; and controlling the simulated vehicle using the first trajectory, wherein the first time difference is greater than the second time difference.

W. The system of paragraph V, wherein determining the first state as the spatially closest vehicle state comprises: determining a third state of the vehicle within the log data, wherein the third state is associated with at a third time in the physical environment, the third state including a third recorded position of the vehicle at the third time and a third trajectory followed by the vehicle at the third time; and wherein: the third recorded position is spatially closer than the first recorded position, to the position of the simulated vehicle; the first time is within a time threshold of the time in the simulation; and the third time is outside of the time threshold from the time in the simulation.

X. The system of paragraph U, the operations further comprising: determining the first state as the spatially closest vehicle state to the position of the simulated vehicle; and wherein executing the simulation comprises determining an impact region associated with the simulated vehicle, based at least in part on the first distance.

Y. The system of paragraph X, the operations further comprising: modifying the first trajectory, into a modified first trajectory, based at least in part on the first distance; and controlling the simulated vehicle, at the time in the simulation, using the modified first trajectory.

Z. A method comprising: receiving log data associated with an operation of a vehicle over a time period in a physical environment, the log data including a first recorded position of the vehicle at a first time in the physical environment, and a first trajectory associated with the first recorded position; executing a simulation based at least in part on the log data, including controlling a simulated vehicle in a simulated environment, wherein the simulated environment is based at least in part on the physical environment; determining, at a second simulation time in the simulation, a second position of the simulated vehicle in the simulated environment; determining a distance between the second position of the simulated vehicle in the simulated environment and the first recorded position of the vehicle in the physical environment; determining, based at least in part on the distance, the first trajectory as a trajectory for controlling the simulated vehicle; and controlling the simulated vehicle, at the second simulation time during the simulation, using the first trajectory.

AA. The method of paragraph Z, wherein determining the first trajectory as the trajectory for controlling the simulated vehicle comprises: receiving, via the log data, a third recorded position of the vehicle at a third time in the physical environment, and a second trajectory associated with the third recorded position, wherein the second trajectory is different from the first trajectory; determining a second distance between the second position of the simulated vehicle in the simulated environment and the third recorded position of the vehicle in the physical environment; and determining the first trajectory for controlling the simulated vehicle, based at least in part on determining that the distance is less than the second distance.

AB. The method of paragraph Z, wherein the log data includes a plurality of vehicle states, including a first vehicle state associated with the first recorded vehicle position, wherein each vehicle state in the plurality of vehicle states includes: a recorded vehicle position associated with the vehicle state; a time associated with the vehicle state; and a trajectory associated with the vehicle state; and wherein determining the first trajectory as the trajectory for controlling the simulated vehicle comprises: determining that the first vehicle state is a spatially closest vehicle state, of the plurality of vehicle states, to the second position of the simulated vehicle.

AC. The method of paragraph AB, wherein determining the first trajectory as the trajectory for controlling the simulated vehicle further comprises: determining a second vehicle state within the log data, wherein the second vehicle state is within a time threshold of the second simulation time; determining a third vehicle state within the log data, wherein the third vehicle state is outside of the time threshold from the second simulation time; and determining that the first vehicle state is spatially closer than the second vehicle state to the second position of the simulated vehicle, and wherein third vehicle state is spatially closer than the first vehicle state to the second position of the simulated vehicle.

AD. The method of paragraph Z, wherein determining the distance between the second position of the simulated vehicle in the simulated environment and the first recorded position of the vehicle in the physical environment comprises: determining a first longitudinal distance between a first starting position in the log data and the first recorded position; determining a second longitudinal distance between a second starting position in the simulation and the second position of the simulated vehicle; and determining a difference between the first longitudinal distance and the second longitudinal distance.

AE. The method of paragraph Z, wherein executing the simulation comprises: determining an impact region associated with the simulated vehicle, based at least in part on the distance between the second position of the simulated vehicle in the simulated environment and the first recorded position of the vehicle in the physical environment.

AF. The method of paragraph Z, further comprising: modifying the first trajectory, into a modified first trajectory, based at least in part on the distance between the second position of the simulated vehicle in the simulated environment and the first recorded position of the vehicle in the physical environment; and controlling the simulated vehicle, at the second simulation time during the simulation, using the modified first trajectory.

AG. The method of paragraph AF, wherein modifying the first trajectory comprises: determining, based at least in part on the first recorded position and the second position, a lateral position error and a longitudinal position error associated with the simulated vehicle; determining, based at least in part on the lateral position error, a modified steering angle for the simulated vehicle; and determining, based at least in part on the longitudinal position error, a modified velocity for the simulated vehicle.

AH. One or more non-transitory computer-readable media storing instructions executable by one or more processors, wherein the instructions, when executed, cause the one or more processors to perform operations comprising: receiving log data associated with an operation of a vehicle over a time period in a physical environment, the log data including a first recorded position of the vehicle at a first time in the physical environment, and a first trajectory associated with the first recorded position; executing a simulation based at least in part on the log data, including controlling a simulated vehicle in a simulated environment, wherein the simulated environment is based at least in part on the physical environment; determining, at a second simulation time in the simulation, a second position of the simulated vehicle in the simulated environment; determining a distance between the second position of the simulated vehicle in the simulated environment and the first recorded position of the vehicle in the physical environment; determining, based at least in part on the distance, the first trajectory as a trajectory for controlling the simulated vehicle; and controlling the simulated vehicle, at the second simulation time during the simulation, using the first trajectory.

AI. The one or more non-transitory computer-readable media of paragraph AH, wherein determining the first trajectory as the trajectory for controlling the simulated vehicle comprises: receiving, via the log data, a third recorded position of the vehicle at a third time in the physical environment, and a second trajectory associated with the third recorded position, wherein the second trajectory is different from the first trajectory; determining a second distance between the second position of the simulated vehicle in the simulated environment and the third recorded position of the vehicle in the physical environment; and determining the first trajectory for controlling the simulated vehicle, based at least in part on determining that the distance is less than the second distance.

AJ. The one or more non-transitory computer-readable media of paragraph AH, wherein the log data includes a plurality of vehicle states, including a first vehicle state associated with the first recorded vehicle position, wherein each vehicle state in the plurality of vehicle states includes: a recorded vehicle position associated with the vehicle state; a time associated with the vehicle state; and a trajectory associated with the vehicle state; and wherein determining the first trajectory as the trajectory for controlling the simulated vehicle comprises: determining that the first vehicle state is a spatially closest vehicle state, of the plurality of vehicle states, to the second position of the simulated vehicle.

AK. The one or more non-transitory computer-readable media of paragraph AJ, wherein determining the first trajectory as the trajectory for controlling the simulated vehicle further comprises: determining a second vehicle state within the log data, wherein the second vehicle state is within a time threshold of the second simulation time; determining a third vehicle state within the log data, wherein the third vehicle state is outside of the time threshold from the second simulation time; and determining that the first vehicle state is spatially closer than the second vehicle state to the second position of the simulated vehicle, and wherein third vehicle state is spatially closer than the first vehicle state to the second position of the simulated vehicle.

AL. The one or more non-transitory computer-readable media of paragraph AH, wherein determining the distance between the second position of the simulated vehicle in the simulated environment and the first recorded position of the vehicle in the physical environment comprises: determining a first longitudinal distance between a first starting position in the log data and the first recorded position; determining a second longitudinal distance between a second starting position in the simulation and the second position of the simulated vehicle; and determining a difference between the first longitudinal distance and the second longitudinal distance.

AM. The one or more non-transitory computer-readable media of paragraph AH, wherein executing the simulation comprises: determining an impact region associated with the simulated vehicle, based at least in part on the distance between the second position of the simulated vehicle in the simulated environment and the first recorded position of the vehicle in the physical environment.

AN. The one or more non-transitory computer-readable media of paragraph AH, the operations further comprising: modifying the first trajectory, into a modified first trajectory, based at least in part on the distance between the second position of the simulated vehicle in the simulated environment and the first recorded position of the vehicle in the physical environment; and controlling the simulated vehicle, at the second simulation time during the simulation, using the modified first trajectory.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

The invention claimed is:

1. A system comprising:
one or more processors; and
non-transitory computer-readable media storing instructions that when executed by the one or more processors, cause the system to perform operations comprising:
receiving log data associated with an operation of a vehicle in a physical environment, wherein the log data includes a trajectory associated with the vehicle and a first position of the vehicle at a first time in the physical environment;
executing a driving simulation, wherein executing the driving simulation comprises controlling a simulated vehicle in a simulated environment to follow the trajectory associated with the vehicle in the physical environment;
receiving simulation data associated with the driving simulation, wherein the simulation data includes a second position of the simulated vehicle in the simulated environment at a second time corresponding to the first time in the physical environment;

determining a lateral position error associated with the driving simulation, wherein the lateral position error represents a lateral position difference between the first position of the vehicle in the physical environment and the second position of the simulated vehicle in the simulated environment;

determining a longitudinal position error associated with the driving simulation, wherein the longitudinal position error represents a longitudinal position difference between the first position of the vehicle in the physical environment and the second position of the simulated vehicle in the simulated environment;

determining a modified safety buffer associated with a second simulated vehicle in a second driving simulation, based at least in part on the lateral position error and the longitudinal position error; and controlling an execution of the second driving simulation based at least in part on the modified safety buffer.

2. The system of claim 1, wherein determining the lateral position error associated with the driving simulation comprises:

determining, based at least in part on the simulation data, the second position of the simulated vehicle in the simulated environment, wherein the second position is longitudinally aligned with the first position of the vehicle in the physical environment; and determining a lateral distance between the first position and the second position.

3. The system of claim 1, wherein determining the longitudinal position error associated with the driving simulation comprises:

determining a first velocity difference between the vehicle at the first time in the physical environment, and the simulated vehicle at the second time in the simulated environment;

determining a second velocity difference between the vehicle at a third time in the physical environment, and the simulated vehicle at a fourth time in the simulated environment; and computing a velocity difference integral between the vehicle and the simulated vehicle, based at least in part on the first velocity difference and the second velocity difference.

4. The system of claim 3, wherein determining the longitudinal position error associated with the driving simulation further comprises:

determining, based at least in part on the log data, a stopping time and an associated stopping position of the vehicle in the physical environment;

determining a simulation position of the simulated vehicle in the simulated environment, at a simulation time associated with the stopping time;

determining a longitudinal distance between the stopping position of the vehicle and the simulation position of the simulated vehicle; and subtracting the longitudinal distance from the velocity difference integral.

5. The system of claim 1, the operations further comprising:

determining, based at least in part on at least one of the lateral position error or the longitudinal position error, a position error distribution associated with the driving simulation; and determining, based at least in part on the log data, a vehicle feature of the vehicle associated with the position error distribution.

6. The system of claim 5, wherein controlling the execution of the second driving simulation comprises:

determining a simulated vehicle feature associated with the second simulated vehicle; and determining a modified safety buffer associated with the second simulated vehicle, based at least in part on the simulated vehicle feature and the position error distribution.

7. A method comprising:

receiving log data including associated with an operation of a vehicle in a physical environment, wherein the log data includes a trajectory associated with the vehicle and a first position of the vehicle at a first time in the physical environment;

executing a driving simulation, wherein executing the driving simulation comprises controlling a simulated vehicle in a simulated environment, based at least in part on the trajectory associated with the vehicle;

receiving simulation data associated with the driving simulation, wherein the simulation data includes a second position of the simulated vehicle in the simulated environment at a second time corresponding to the first time in the physical environment;

determining a position error associated with the driving simulation, wherein the position error represents a position difference between the first position of the vehicle in the physical environment and the second position of the simulated vehicle in the simulated environment;

determining, based at least in part on the position error, a safety buffer associated with a second simulated vehicle in a second driving simulation; and controlling an execution of the second driving simulation, based at least in part on the safety buffer.

8. The method of claim 7, wherein executing the driving simulation comprises:

determining, based at least in part on the log data, the first position as a spatially closest vehicle position of the vehicle to the second position of the simulated vehicle;

determining, as the trajectory, a trajectory of the vehicle associated with the spatially closest vehicle position; and controlling the simulated vehicle, at the second time, based at least in part on the trajectory of the vehicle associated with the spatially closest vehicle position.

9. The method of claim 7, wherein determining the position error associated with the driving simulation comprises:

determining, based at least in part on the simulation data, the second position of the simulated vehicle in the simulated environment, wherein the second position is longitudinally aligned with the first position of the vehicle in the physical environment; and determining a lateral distance between the first position and the second position.

10. The method of claim 7, wherein determining the position error associated with the driving simulation comprises:

determining a first velocity difference between the vehicle at the first time in the physical environment, and the simulated vehicle at the second time in the simulated environment;

determining a second velocity difference between the vehicle at a third time in the physical environment, and the simulated vehicle at a fourth time in the simulated environment; and computing a velocity difference integral between the vehicle and the simulated vehicle, based at least in part on the first velocity difference and the second velocity difference.

11. The method of claim 10, wherein determining the position error associated with the driving simulation further comprises:

determining, based at least in part on the log data, a stopping time and an associated stopping position of the vehicle in the physical environment;

determining a simulation position of the simulated vehicle in the simulated environment, at a simulation time associated with the stopping time;

determining a longitudinal distance between the stopping position of the vehicle and the simulation position of the simulated vehicle; and subtracting the longitudinal distance from the velocity difference integral.

12. The method of claim 7, further comprising:

determining, based at least in part on the position error, a position error distribution associated with the driving simulation; and determining, based at least in part on the log data, a vehicle feature of the vehicle associated with the position error distribution.

13. The method of claim 12, wherein controlling the execution of the second driving simulation comprises:

determining a simulated vehicle feature associated with the second simulated vehicle; and determining a modified safety buffer associated with the second simulated vehicle, based at least in part on the simulated vehicle feature and the position error distribution.

14. One or more non-transitory computer-readable media storing instructions executable by one or more processors, wherein the instructions, when executed, cause the one or more processors to perform operations comprising:

receiving log data including associated with an operation of a vehicle in a physical environment, wherein the log data includes a trajectory associated with the vehicle and a first position of the vehicle at a first time in the physical environment;

executing a driving simulation, wherein executing the driving simulation comprises controlling a simulated vehicle in a simulated environment, based at least in part on the trajectory associated with the vehicle;

receiving simulation data associated with the driving simulation, wherein the simulation data includes a second position of the simulated vehicle in the simulated environment at a second time corresponding to the first time in the physical environment;

determining a position error associated with the driving simulation, wherein the position error represents a position difference between the first position of the vehicle in the physical environment and the second position of the simulated vehicle in the simulated environment;

determining, based at least in part on the position error, a safety buffer associated with a second simulated vehicle in a second driving simulation; and controlling an execution of the second driving simulation, based at least in part on the safety buffer.

15. The one or more non-transitory computer-readable media of claim 14, wherein executing the driving simulation comprises:

determining, based at least in part on the log data, the first position as a spatially closest vehicle position of the vehicle to the second position of the simulated vehicle;

determining, as the trajectory, a trajectory of the vehicle associated with the spatially closest vehicle position; and controlling the simulated vehicle, at the second time, based at least in part on the trajectory of the vehicle associated with the spatially closest vehicle position.

16. The one or more non-transitory computer-readable media of claim 14, wherein determining the position error associated with the driving simulation comprises:

determining, based at least in part on the simulation data, the second position of the simulated vehicle in the simulated environment, wherein the second position is longitudinally aligned with the first position of the vehicle in the physical environment; and determining a lateral distance between the first position and the second position.

17. The one or more non-transitory computer-readable media of claim 14, wherein determining the position error associated with the driving simulation comprises:

determining a first velocity difference between the vehicle at the first time in the physical environment, and the simulated vehicle at the second time in the simulated environment;

determining a second velocity difference between the vehicle at a third time in the physical environment, and the simulated vehicle at a fourth time in the simulated environment; and computing a velocity difference integral between the vehicle and the simulated vehicle, based at least in part on the first velocity difference and the second velocity difference.

18. The one or more non-transitory computer-readable media of claim 17, wherein determining the position error associated with the driving simulation further comprises:

determining, based at least in part on the log data, a stopping time and an associated stopping position of the vehicle in the physical environment;

determining a simulation position of the simulated vehicle in the simulated environment, at a simulation time associated with the stopping time;

determining a longitudinal distance between the stopping position of the vehicle and the simulation position of the simulated vehicle; and subtracting the longitudinal distance from the velocity difference integral.

19. The one or more non-transitory computer-readable media of claim 14, the operations further comprising:

determining, based at least in part on the position error, a position error distribution associated with the driving simulation; and determining, based at least in part on the log data, a vehicle feature of the vehicle associated with the position error distribution.

20. The one or more non-transitory computer-readable media of claim 19, wherein controlling the execution of the second driving simulation comprises:

determining a simulated vehicle feature associated with the second simulated vehicle; and determining a modified safety buffer associated with the second simulated vehicle, based at least in part on the simulated vehicle feature and the position error distribution.

* * * * *